US012592172B2

(12) United States Patent
Xu et al.

(10) Patent No.: US 12,592,172 B2
(45) Date of Patent: Mar. 31, 2026

(54) SYSTEMS, METHODS, AND APPARATUSES FOR PROVIDING A VERSATILE MEMS-BASED DISPLAY

(71) Applicant: Adeia Guides Inc., San Jose, CA (US)

(72) Inventors: Ning Xu, Irvine, CA (US); Toshiro Ozawa, Irvine, CA (US); Tao Chen, Palo Alto, CA (US); Charles Dasher, Lawrenceville, GA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 18/616,660

(22) Filed: Mar. 26, 2024

(65) Prior Publication Data

US 2025/0308421 A1 Oct. 2, 2025

(51) Int. Cl.
*G09G 3/00* (2006.01)

(52) U.S. Cl.
CPC ....... *G09G 3/007* (2013.01); *G09G 2320/068* (2013.01); *G09G 2340/0464* (2013.01)

(58) Field of Classification Search
CPC ........................... G02B 26/0833; G02B 27/14; G02B 27/0101; G02B 2027/0145; G09G 3/02; G09G 2380/10; G02G 2027/0125
See application file for complete search history.

(56) References Cited

U.S. PATENT DOCUMENTS 7,920,154 B2 4/2011 Brown et al.
9,824,642 B2 11/2017 Andrysco et al.
11,166,008 B2 * 11/2021 Monnerat ............ H04N 13/351
11,810,487 B2 11/2023 Dhiman et al.
12,417,752 B2 * 9/2025 Ng .......................... G09G 5/14
2004/0174583 A1 * 9/2004 Chen .................. G02B 26/0841 359/290
2006/0250335 A1 11/2006 Stewart et al.
2007/0053652 A1 3/2007 Mignard et al.
2007/0296691 A1 12/2007 Sampsell
(Continued)

OTHER PUBLICATIONS

C. Duan, W. Wang, X. Zhang, L. Zhou, A. Pozzi and H. Xie, “A Self-Aligned 45°-Tilted Two-Axis Scanning Micromirror for Side-View Imaging,” in Journal of Microelectromechanical Systems, vol. 25, No. 4, pp. 799-811, Aug. 2016.
(Continued)

*Primary Examiner* — Olga V Merkoulova
(74) *Attorney, Agent, or Firm* — HG LAW LLP

(57) ABSTRACT

Systems, methods, and apparatuses describe a display and control circuitry configured to modify the display. The display comprises a plurality of pixels corresponding to a plurality of subsets of the display and a plurality of MEMS actuators configured to modify the orientations of the pixels. The control circuitry may be configured to cause each respective MEMS actuator to control an orientation of a respective pixel of the plurality of pixels by causing a subset of the plurality of MEMS actuators to modify orientations of a corresponding first subset of the plurality of pixels associated with a first viewing position in an environment of the display. The control circuitry may be further configured to cause the first subset of the plurality of pixels having the modified orientations to display particular content directed to the first viewing position, wherein the particular content is obscured from a second viewing position of the environment.

19 Claims, 14 Drawing Sheets

(56) References Cited

U.S. PATENT DOCUMENTS

| | | | | |
|---|---|---|---|---|
| 2008/0285282 | A1* | 11/2008 | Karman | H10K 77/10 362/249.16 |
| 2010/0295827 | A1* | 11/2010 | Lim | G09G 3/20 359/484.01 |
| 2011/0032246 | A1* | 2/2011 | Hong | G02B 26/0841 359/230 |
| 2015/0029754 | A1* | 1/2015 | Ouderkirk | G02B 6/0028 362/628 |
| 2015/0091890 | A1* | 4/2015 | Andrysco | G09G 3/3473 345/419 |
| 2015/0279010 | A1* | 10/2015 | Cianfrone | G09G 3/3433 345/592 |
| 2015/0286047 | A1* | 10/2015 | Lewis | G09G 3/2022 345/84 |
| 2017/0208321 | A1* | 7/2017 | Monnerat | H04N 13/351 |
| 2017/0315352 | A1* | 11/2017 | Hardy | G02B 26/0833 |
| 2018/0357981 | A1* | 12/2018 | Ng | G06F 3/1423 |
| 2021/0092463 | A1* | 3/2021 | Gupta | A63F 13/5255 |
| 2021/0092464 | A1* | 3/2021 | Gupta | G06V 20/42 |
| 2021/0360222 | A1 | 11/2021 | Liu | |
| 2022/0172651 | A1* | 6/2022 | Dhiman | G06F 3/1431 |
| 2024/0029597 | A1* | 1/2024 | Dhiman | G06F 3/1431 |

OTHER PUBLICATIONS

G. J. Woodgate, M.G. Robinson, J.H. Benjamin, C. Ihas, R. A. Ramsey. Display visual security: from laptop privacy to no driver distraction for automotive passenger infotainment. SID 2022 Digest, pp. 804¬807.

* cited by examiner

SYSTEMS, METHODS, AND APPARATUSES FOR PROVIDING A VERSATILE MEMS-BASED DISPLAY

BACKGROUND

The present disclosure is directed to systems, methods, and apparatuses for providing or controlling a display that comprises a plurality of pixels and a plurality of micro-electromechanical system (MEMS) actuators. More particularly, the display is configured to cause each respective MEMS actuator of the plurality of MEMS actuators to control a viewing angle of a respective pixel of the plurality of pixels.

SUMMARY

As the use of digital displays expands to more and more user products, there is a growing need to make displays more versatile. For instance, displays utilized in shared viewing environments for purposes such as vehicle infotainment, video entertainment, gaming, and/or advertisement may need to display unique content to multiple users, each of whom may wish to view different content, and one or more of whom may wish to ensure that other users outside of the primary user's viewing position cannot see content displayed to the user.

One approach to displaying unique content and providing privacy for each respective viewer in a shared viewing environment utilizes multiple displays such that each user can be assigned to (and view content via) his or her own display. In this approach, users can view their desired content on their personal display, and such personal display may be equipped with a privacy screen or film to provide privacy protection.

Privacy screens such as polarized privacy filters or micro-louver layers can provide privacy for users by limiting the angles at which viewers can see the content on the screen; however, these technologies have not been optimized for a display that simultaneously displays different content. Further, such privacy screens are often implemented as physical barriers on top of the display screen, which may be cumbersome and inflexible in terms of their ability to function in multiple display modes, as well as reducing the brightness of the image seen by the viewers. Further, certain shared viewing environments used for vehicle infotainment, advertisement, and/or entertainment may operate in confined areas and thus may not have the space to accommodate every user in the environment with their own display. This can, therefore, lead to certain users viewing content that they may not be interested in. Moreover, requiring each user to be provided with his or her own display, and with his or her own privacy screen, in such an environment may lead to increased costs and/or resource consumption to facilitate such a user experience.

In another approach, displays may be equipped with parallax barriers to display unique content to different viewing angles. While parallax barriers enable a system to equip only one display to show unique content to multiple users, parallax barriers are nonetheless physical barriers on top of the display screen and therefore reduce the brightness and resolution of the image seen by the viewers. As another downside, parallax barriers are rigid and permanent structures integrated onto a screen and can therefore function only in a single mode. A user does not have the option to turn their screen with a parallax barrier into a normal screen. There is a need for a display that may be efficiently used in, and adapt to, shared viewing environments to provide unique displayed content to respective users in an environment, while also providing privacy for the content being provided to such users and being versatile enough to operate in normal and specialized modes.

To help overcome these issues, systems, methods, and apparatuses are disclosed herein for displaying content for at least a first viewing position. The system described herein may comprise a display and control circuitry. The display comprising a plurality of pixels corresponding to a plurality of portions of the display, and a plurality of micro-electromechanical system (MEMS) actuators. The control circuitry may be configured to cause each respective MEMS actuator of the plurality of MEMS actuators to control an orientation of a respective pixel of the plurality of pixels. The control circuitry may do so by causing a first subset of the plurality of MEMS actuators to modify orientations of a corresponding first subset of the plurality of pixels associated with a first viewing position in an environment of the display. The control circuitry may be further configured to cause the first subset of the plurality of pixels having the modified orientations to display particular content directed to the first viewing position, wherein the particular content is obscured from a second viewing position of the environment that is associated with a second subset of the plurality of pixels.

Such aspects enable using MEMS-based technology to display particular content that is visible to a first viewing position in an environment surrounding the display, while preventing such particular content from being visible from the second viewing position in the environment of the display. In some embodiments, such disclosed techniques may enable the display disclosed herein to be configured to operate in various modes, e.g., a first mode in which content is visible to only certain viewing position(s) surrounding the display to enable personalized and private viewing using a single display, or a second mode in which content is visible to any viewing position surrounding the display. In some embodiments, if the desired first viewing position and second viewing position change, the control circuitry can cause one or more of the MEMS actuators to modify one or more subsets of the plurality of pixels to adjust viewing angles to new viewing angles corresponding to the new viewing positions.

In some embodiments, the particular content is a first content item. The control circuitry may be further configured to cause a second subset of the plurality of MEMs actuators to modify orientations of a corresponding second subset of the plurality of pixels associated with the second viewing position in the environment of the display. The control circuitry may be further configured to cause the second subset of the plurality of pixels to display a second content item directed to the second viewing position, wherein the second content item is obscured from the first viewing position of the environment that is associated with the first subset of the plurality of pixels, and wherein the first viewing position is different from the second viewing position, and the second content item is different from the first content item.

Such aspects enable a single display to simultaneously display a unique first content item to a first user in a first viewing position and a unique second content item to a second user in a second viewing position. In a shared viewing environment such as, for example, a vehicle dashboard, an infotainment system utilizing this display may exclusively show navigation information to the driver while exclusively showing a movie to the passenger. The disclosed techniques may help ensure that the driver or operator of the vehicle is not distracted from unrelated information and that any private information is only seen by the viewer who requested to show it from their viewing position. In some embodiments, providing for display unique content to each respective user may allow advertisements (or other content) to be more personalized and private to each person viewing the display.

In some approaches, the control circuitry is further configured to cause a third and fourth subset of the plurality of MEMs actuators to modify orientations of a corresponding respective third subset of the plurality of pixels and fourth subset of the plurality of pixels associated with a respective third viewing position and fourth viewing position in an environment of the display, to cause a respective third content item and fourth content item to be directed to the respective third viewing position and fourth viewing position. The third content item may be obscured from the first viewing position, second viewing position, and fourth viewing position of the environment and the fourth content item may be obscured from the first viewing position, second viewing position, and third viewing position.

In some embodiments, the control circuitry is further configured to cause a fifth subset of pixels to display content without controlling MEMS actuators corresponding to the fifth subset of pixels to modify orientations of the fifth subset of the plurality of pixels. The particular content may be directed to the first viewing position, second viewing position, third viewing position, and fourth viewing position of the environment. Such approaches may be implemented on the tabletop of a gaming device.

In such aspects, the display may be optimized to display certain aspects of a game table for either a private portion or shared portion of the game. For example, the fifth subset of pixels may display a set of cards in the middle of the table display that each player can view and act on in order to play the game. Each of the first viewing position, second viewing position, third viewing position, and fourth viewing position may display a deck of cards that can be only viewed from the player position in the respective viewing position.

In some approaches, the control circuitry is further configured to cause the display to operate in a first mode and a second mode. When in the first mode, the control circuitry causes the first subset of the plurality of MEMS actuators to modify the orientations of the corresponding first subset of the plurality of pixels associated with the first viewing position in the environment of the display. This causes the particular content to be directed to the first viewing position and causes the particular content to be obscured from the second viewing position. When in the second mode, the control circuitry causes the plurality of pixels to display content without causing the MEMS actuators to modify the viewing angles of the plurality of pixels, wherein the particular content is directed to both the first viewing position and the second viewing position of the environment.

In some embodiments, wherein the particular content is the first content, the control circuitry is further configured to cause the plurality of MEMS actuators to oscillate the plurality of pixels between a first orientation corresponding to the first viewing position and a second orientation corresponding to the second viewing position. The control circuitry may cause the plurality of pixels to display the first content item when the plurality of pixels orient to the first orientation and cause the plurality of pixels to display a second content item when the plurality of pixels orient to the second orientation. In some approaches, the control circuitry is configured to set a rate at which the plurality of pixels oscillates based on a frame rate of the first content item and a frame rate of the second content item.

In some embodiments, the display further comprises for each pixel of the plurality of pixels, a MEMS rod configured to enable a height of the respective pixel to be adjusted. The control circuitry may be configured to cause the first subset of the plurality of MEMS actuators to modify orientations of the corresponding subset of the plurality of pixels associated with the respective viewing position in the environment of the display based on at least in part by adjusting the heights of the subset of the plurality of pixels using the MEMS rods.

In some approaches, each pixel of the plurality of pixels further comprises a retarder layer configured to narrow an area to which light emitted by the pixel is directed. This may ensure that the particular content is caused to be obscured from the second viewing position based on the narrowed area caused by the retarder layer and the modified orientation of the first subset of the plurality of pixels.

In some approaches, the display may further comprise a sensor. The control circuitry would be further configured to identify, based on sensor data received from the sensor, a location of a first user and a location of a second user and determine, as the first viewing position, an area around the location of the first user and determine, as the second viewing position, an area around the location of the second user.

Such aspects enable the display to adapt to different shared viewing environments with different desired viewing positions. Whereas previous approaches of displays could only display content to a predetermined range of viewing angles, the described display can adapt to the positions of the users in the shared viewing environment. For example, as a user moves around, the control circuitry may modify the pixels based on the sensor data to always match the viewing angle of the user. This ensures that the user always sees a clear and bright image from their perspective.

In some embodiments, the display is a vehicle display. The control circuitry may be further configured to retrieve, from computer memory, a location of a driver's seat as the first viewing position and a retrieve, from the computer memory, a location of a passenger's seat as the second viewing position.

In some approaches, each pixel of the plurality of pixels further comprises a plurality of sub-pixels, and each MEMS actuator of the plurality of MEMS actuators further comprises sub-MEMS actuators. In such an approach, the control circuitry may be further configured to individually modify orientations of a corresponding subset of the sub-pixels of a respective pixel of the plurality of pixels.

In some embodiments, the first subset of the plurality of pixels and the second subset of the plurality of pixels are arranged in alternating rows between the first subset of the plurality of pixels and the second subset of the plurality of pixels. In some embodiments, the first subset of the plurality of pixels and the second subset of the plurality of pixels are arranged in alternating columns. In some approaches, the first subset of the plurality of pixels and the second subset of the plurality of pixels are arranged in a checkered pattern.

BRIEF DESCRIPTION OF THE DRAWINGS

The present disclosure, in accordance with one or more various embodiments, is described in detail with reference to the following figures. The drawings are provided for the purposes of illustration only and merely depict typical or example embodiments. These drawings are provided to facilitate an understanding of the concepts disclosed herein and should not be considered limiting of the breadth, scope, or applicability of these concepts. It should be noted that, for clarity and ease of illustration, these drawings are not necessarily made to scale.

DETAILED DESCRIPTION

Figure 1:
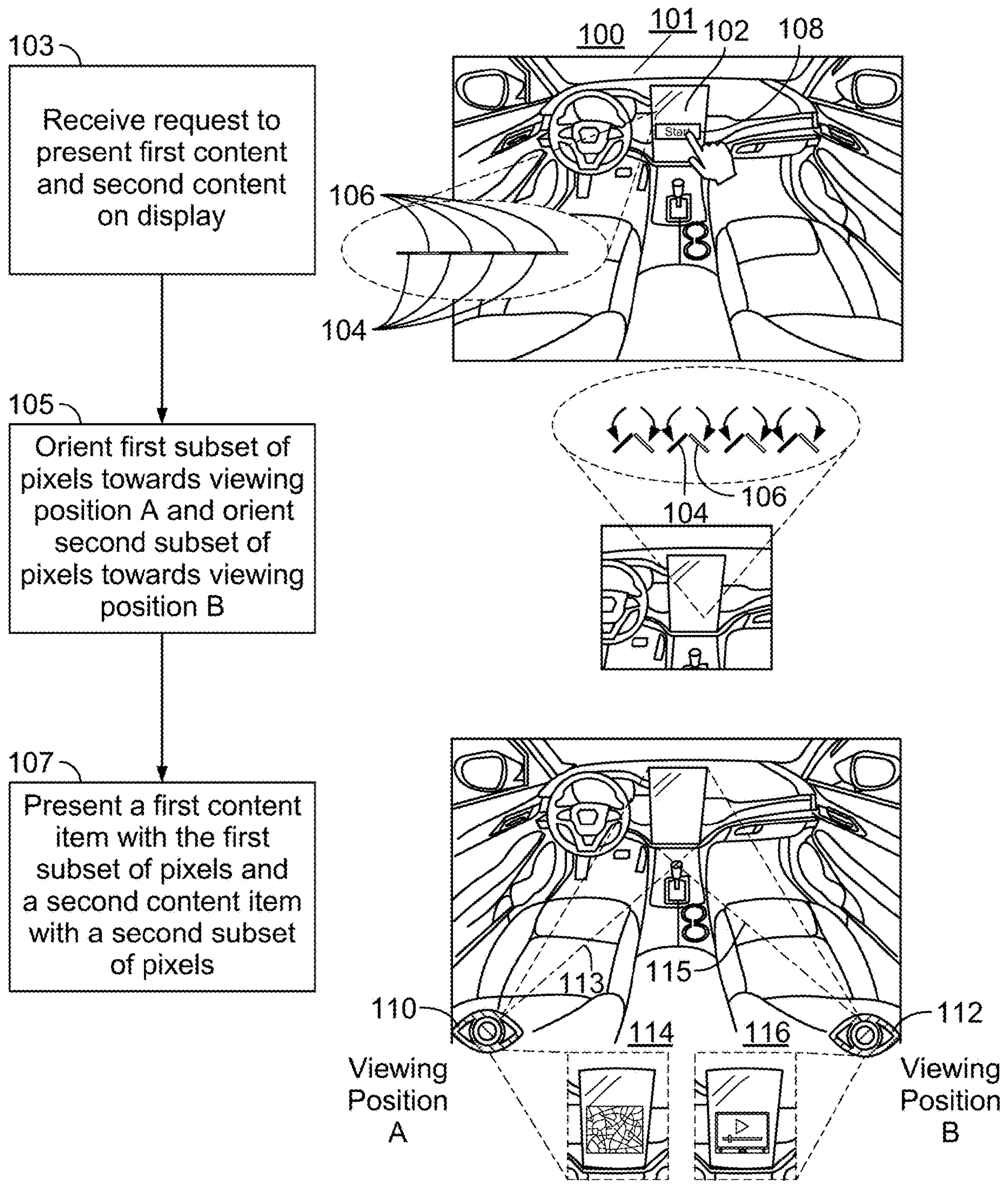
FIG. 1 is a schematic illustration for modifying the pixels of a display to present first content and second content to corresponding viewing positions, in accordance with some embodiments of this disclosure.

FIG. 1 is a schematic illustration for modifying pixels of a display to present first content and second content to corresponding viewing positions, in accordance with some embodiments of this disclosure. In some embodiments, display 102, e.g., a micro-electromechanical system (MEMS)-based display, may be provided. In some embodiments, display 102 may be integrated into shared spaces for vehicle infotainment, video entertainment, gaming, advertisement, any other suitable purpose, or any combination thereof. For example, a vehicle interior (e.g., vehicle dashboard 101 of vehicle 100) may be equipped with display 102, which may be configured to direct different content (e.g., images or video) to different viewing positions within vehicle 100. Display 102 may include pixel subset A 104 (represented by the black pixels) and pixel subset B 106 (represented by the white pixels), each configured to modify their respective orientations (e.g., based on instructions received from control circuitry of display 102, control circuitry of vehicle 100, control circuitry 904 of FIG. 9, and/or control circuitry of a remote server, collectively referred to as "a display controller"). Display 102 may employ miniature devices using microfabricated mechanical structures to direct light to multiple viewing directions simultaneously.

Figure 2:
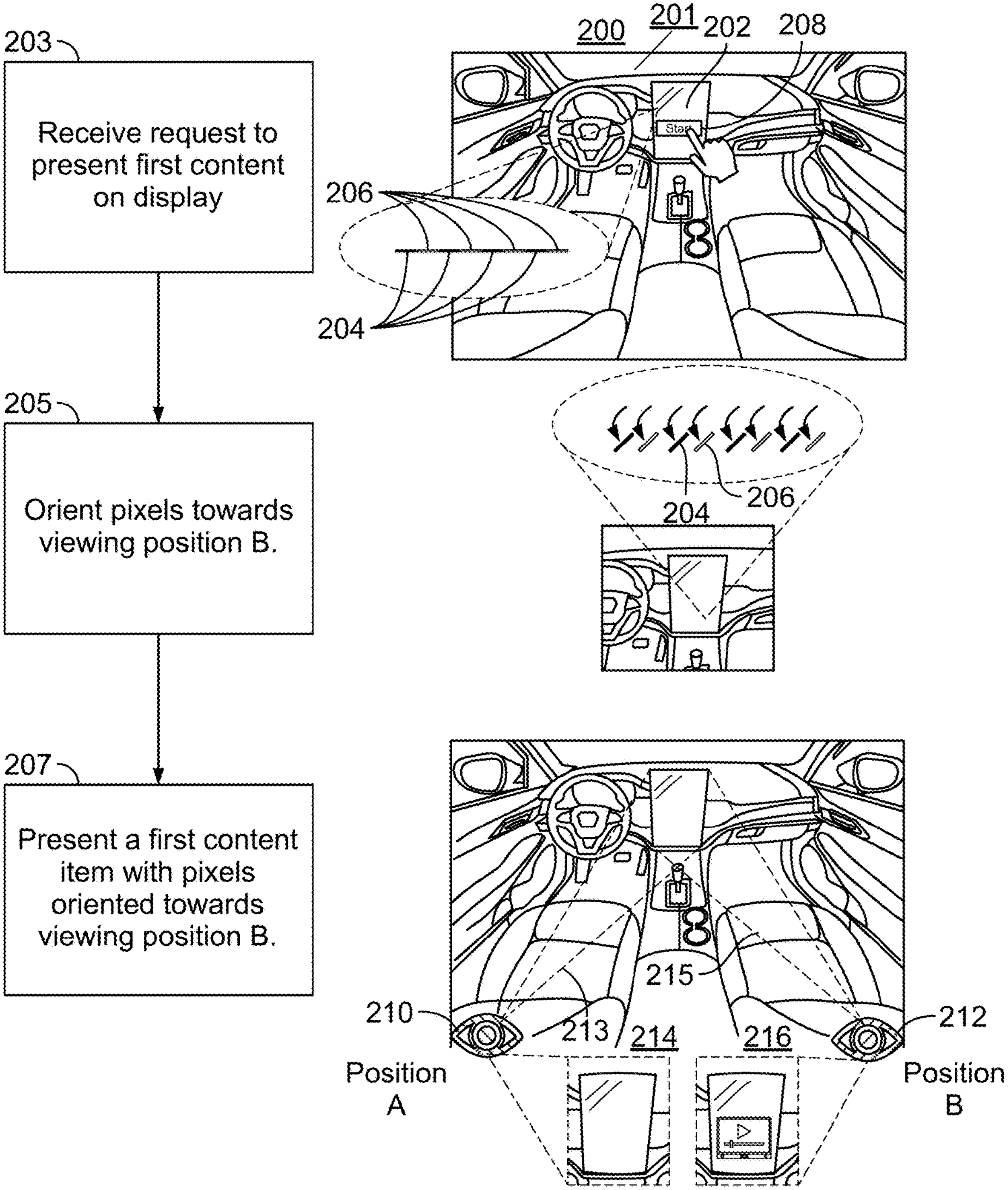
FIG. 2 is a schematic illustration for modifying pixels of a display to present particular content to a corresponding viewing position, in accordance with some embodiments of this disclosure.

While the example of FIGS. 1-2 is display 102 being incorporated into vehicle 100 as a car or automobile, display 102 may be incorporated into any other suitable vehicle (e.g., a delivery truck, a delivery van, a delivery car, a coupe, a sedan, a truck, an SUV, a bus, or any other suitable type of vehicle, or any combination thereof), a motorcycle, an aircraft (e.g., a drone, or any other suitable type of aircraft), a watercraft (e.g., a boat or any other suitable type of watercraft), or any other suitable type of vehicle, or any combination thereof.

While the example of FIGS. 1-2 show display 102 being incorporated into vehicle 100, display 102 may be implemented as any other suitable display. For example, display 102 may be a display of a head-mounted computing device; a mobile device such as, for example, a smartphone or a tablet; a camera; a camera array; a laptop computer; a smart watch or wearable device; smart glasses; a stereoscopic display; a wearable camera; extended reality (XR) glasses; XR goggles; an XR head-mounted display (HMD); a near-eye display device; a robot; any other suitable computing device; or any combination thereof.

The orientations of the display pixels may be modified by using one or more portions of (e.g., one or more layers of) MEMS actuators in the display as will be described further in relation to FIG. 4. For example, a display controller may send commands or electric signals to respective MEMS actuators to control the MEMS actuators to tilt a subset of pixels to a particular orientation. In some embodiments, this may be performed as part of a directional viewing mode of display 102. For example, display 102 may be configured to switch between the directional viewing model and a standard mode (e.g., automatically, or based on input received from a user). In some embodiments, the display controller may initially set the MEMS actuators of the display 102 to the standard mode, in which all (or substantially all) of the MEMS-actuators orient the pixels of the display to a flat position. The standard mode of the display enables a conventional viewing experience comparable to a viewing experience viewers would get with a screen with static flat pixels. In some embodiments, the display may be set to a standard mode (e.g., by default, or based on input received from a user) when a single, consistent image is intended to be displayed for all viewers. For example, if passengers of a vehicle are responsible for assisting the driver of the vehicle with navigation to a particular destination, the display controller may set the pixels of the display to standard mode to enable both the passengers and driver to see any navigation information that the display shows.

In some embodiments, at step 103, display 102 of vehicle 100 may receive input from an occupant (e.g., a passenger or a driver) indicating their desire to view content on display 102 that is not meant to be seen by the driver. For example, the content requested by the passenger may be video entertainment that is potentially distracting to the driver's ability to concentrate on the road. As another example, display 102 of vehicle 100 may receive input from the driver indicating that they wish to view content on display 102 that is not meant to be seen by the passengers, such as, for example, driver-specific vehicle information (e.g., GPS information, a current speed of vehicle 100, and/or other suitable information). In some embodiments, such as if vehicle 100 is operating autonomously or semi-autonomously, an occupant in the driver's seat may desire to view content (e.g., a movie or television show or live event) via display 102 different from content to be presented to the occupant in the passenger's seat via display 102. In some embodiments, different content may be provided to the occupant in the driver's seat and to the occupant in the passenger's seat simultaneously, e.g., to allow the driver to follow along to a sports game, while remaining focused on the road.

In some embodiments, the occupant in the driver's seat and the occupant in the passenger's seat may request to view their respective content (e.g., video entertainment for the passenger and vehicle information for the driver) concurrently. While conventional approaches for concurrently displaying content use multiple displays or a split screen mode with limited privacy, display 102 enables users to view content simultaneously and privately by entering a directional viewing mode that modifies the orientations of pixel subset A 104 and pixel subset B 106. In the directional viewing mode, at step 105, the display controller may instruct MEMS actuators to tilt pixel subset A 104 to viewing angle A 113 for viewing position A 110 (e.g., the driver's seat) and to tilt pixel subset B 106 to viewing angle B 115 for viewing position B 112 (e.g., the passener's seat). In some embodiments, the display controller may transmit the instructions to the MEMS actuators to enter directional viewing mode based on receiving a user input (e.g., user input 108) corresponding to a request to enter directional viewing mode. In some embodiments, the display controller may transmit the instructions to the MEMS actuators to enter directional viewing mode automatically based on historical behavior and/or content preferences of the occupants or the current state of the vehicle in which the display may be incorporated. For example, in response to receiving a request to simultaneously display multiple content items, the display controller may automatically set the display to directional viewing mode based on determining that the viewers prefer directional viewing mode over other simultaneous viewing modes such as split screen.

In some embodiments, the display controller may utilize spatial data from cameras and/or sensors (e.g., camera 918 of FIG. 9) to track the viewing positions of the viewers in vehicle 100. For example, cameras or spatial sensors may be positioned in vehicle 100 and may be configured to obtain sensor data, which may be used by the display controller to determine where a user that requested content to be provided via display 102 is located. The display controller may then determine the viewing angle of the respective user, and/or any changes to such viewing angle, by tracking the eyes of the user, the head of the user, the body of the user, any other suitable physical marker, or any combination thereof. By integrating viewer tracking technology, the orientations of the pixel subset A 104 and pixel subset B 106 can be strategically controlled to tilt towards specific viewing angles corresponding to the viewer positions, ensuring that each viewer can see the display clearly and without overlap in content. This user tracking technology may be combined with any suitable embodiment of a mode for the MEMS display as described in this disclosure.

In some embodiments, a pixel orientation may be stored in association with a known viewing position. For example, if the passenger sitting in the front seat of a car requests to view content, the display controller may retrieve from the vehicle memory (e.g., storage 908 of FIG. 9) or server storage (e.g., storage 1014 of FIG. 10) a known pixel orientation associated with the viewing angle of the front seat viewing position. In some embodiments, the user may be prompted to confirm a seat of vehicle 100 in which he or she is sitting. For example, the vehicle memory or other suitable memory may store an indication of a location of each seat or other portion of vehicle 100 and its corresponding viewing angle. As another non-limiting example, on an airplane, multiple seats may share a single display, e.g., display 102. For example, display 102 may be shared by a first passenger located in an aisle seat, a second passenger located in a middle seat, and a third passenger located in a window seat, and memory (e.g., of display 102 or other suitable memory) may store pixel orientations corresponding to each seat, to enable each of the first, second, and third passengers to view different content simultaneously via display 102.

In some embodiments, the sensor data obtained by the display controller from the cameras or spatial sensors may be used to calculate an approximate angle of reflection between, for example, display 102 and the incident light within the shared viewing environment (e.g., within a cabin of vehicle 100). Based on the determination, the display controller may instruct one or more actuators to tilt the pixels to an orientation that enables reflected light to be directed from the pixel to an area outside of the respective viewing positions of display 102. By directing reflected light away from the display viewers, the tilted pixels may reduce the glare seen on the screen for a particular user, thereby increasing the readability of display content. Any mode or embodiment for the MEMS-based display described herein may involve accounting for the angle of reflection when tilting the pixels to a particular orientation in order to prevent glare for a particular viewer.

At step 107, once the display controller tilts pixel subset A 104 and pixel subset B 106 towards different viewing positions, the display controller may instruct display 102 to simultaneously display unique content to respective viewing positions. For example, pixel subset A 104 tilted towards viewing position A 110 may display content A 114 (e.g., navigation information) and pixel subset B 106 tilted towards viewing position B 112 may display content B 116 (e.g., video entertainment). In some embodiments, content being provided via display 102 is visible (or substantially visible) to a user only if such user is located in the viewing position that the content is being directed to. For example, a driver sitting at the driver's seat corresponding to viewing position A 110 may see only navigation information since pixel subset A 104 directed towards the driver is displaying only that content. Any content displayed by pixel subset B 106 is not directed towards viewing position A 110 and therefore is not visible to (or is otherwise obscured in relation to) the driver. As another example, a passenger sitting in the passenger's seat corresponding to viewing position B 112 may see only the video entertainment corresponding to content 116 displayed from pixel subset B directed towards them, as content A 114 being simultaneously displayed by display 102 may be obscured with respect to the passenger sitting at the passenger seat corresponding to viewing position B 112. Just as the driver cannot see the video entertainment corresponding to content B 116 (or the video entertainment is substantially obscured with respect to the driver), the passenger does not see the navigation information corresponding to content A 114 (or the navigation information is substantially obscured with respect to the passenger) since such content A 114 is not being directed towards (or is substantially not directed towards) the passenger's viewing position by pixel subset A 104. In some embodiments, each viewing position can be correlated to a specific stereo or headset (e.g., audio output equipment 914) in the shared viewing environment so that each viewer receives the audio corresponding to the content they requested. For example, a viewer at viewing position B 112 may be using headphones that correspond to viewing position B 112. Thus when content B 116 is directed to viewing position B 112, control circuitry may only output the audio associated with content B 112 to the respective headphones.

In some embodiments, display 102 may include additional pixel subsets directed to other viewers in the shared viewing environment. For example, a user in the back-middle seat may want to view content on the display as well. A third subset of pixels may be directed to the backseat viewer displaying content that is not visible from the driver or front passenger position. FIG. 1 demonstrates how the directional viewing mode is especially beneficial in environments like vehicle interiors, where it enables driver and passengers to privately view different information or entertainment on the same screen, thereby enhancing the in-vehicle infotainment experience.

FIG. 2 is a schematic illustration for modifying the pixels of a display to present first content to a corresponding viewing position, in accordance with some embodiments of this disclosure. While the directional viewing mode of FIG. 1 describes modifying the pixels of the display to various orientations for various viewing positions, FIG. 2 describes modifying the pixels of the display to one orientation for a single viewing position. For example, a vehicle interior (e.g., vehicle dashboard 201 of vehicle 200) may be equipped with display 202 (which may correspond to display 102 in FIG. 1) to enable display of content to the passenger (located at the passenger's seat corresponding to viewing position B 212) without distracting the driver (located at the driver's seat corresponding to viewing position A 210). In some embodiments, the display controller may initially set the MEMS-based display to a standard mode such that pixel subset A 204 and pixel subset B 206 are set to a flat orientation. When set to the standard mode, the display 202 may act as a conventional screen so that content shown by the display is visible within a wide range of viewing angles, e.g., including at least viewing angles associated with viewing positions 210 and 212.

At step 203, display 206 may receive user input 208. In some embodiments, a passenger of vehicle 200 may want to view content on the vehicle display that is not meant to be seen by the driver (e.g., because it may distract the driver from operating vehicle 200). In some embodiments, the passenger may specifically request (e.g., through user input 208) to present the content only to their viewing position 212, or the display controller may automatically determine that the content requested (e.g., via user input 208) by the user located at viewing position 212 would be potentially distracting to the driver located at viewing position 210. For example, the display controller may analyze metadata associated with the content to determine whether the content can be consumed while operating a vehicle 200, e.g., whether the content is a talk show or sports game that the driver may not have to visually consume to follow, or whether the content is an action-packed thriller that should not be consumed by the driver as the driver may be tempted to focus on display 202 for prolonged periods of such content instead of the road.

At step 205, in response to the request and/or determination, the pixels of the MEMS-based display (i.e., pixel subset A 204 and pixel subset B 206) may be tilted towards viewing angle of position B 212 of the passenger. In some embodiments, whether to display content to only viewing position 212 or each of viewing positions 210 and 212 may be based at least in part on a current state of vehicle 200. For example, if vehicle 200 is determined to be stopped or traveling less than a threshold distance over a period of time (e.g., in park, stopped at a red light, or stuck in traffic), and/or vehicle 200 is in an autonomous or semi-autonomous mode, the display controller may cause the content to be displayed to each of viewing positions 210 and 212. On the other hand, if vehicle 200 is determined to be in drive and is traveling above a certain speed or has traveled a certain amount of distance over a period of time, the display controller may cause the content to be displayed to viewing positions 210 but not directed to viewing position 212.

At step 207, once pixel subset A 204 and pixel subset B 206 are tilted towards viewing angle B 215 of viewing position B 212, the display controller may instruct display 202 to display content to viewing position B 212. For example, the display controller may cause display 206 to present content B 216 (e.g., video entertainment) to a passenger located at viewing position B 212. Since all (or substantially all) pixels of the display may be controlled to be directed towards viewing position B, an occupant looking at the display from viewing angle A 213 of viewing position A 210 may only see blank screen 214 (or the view of content from viewing position 210 may be otherwise substantially obscured). Such an embodiment of display 202 enables passengers to utilize the display for purposes such as video entertainment or video games (or any other suitable content) without exposing the driver to the distracting content. This mode of operation where all pixels are oriented away from the viewing position of the driver may therefore be called "No-distraction" mode.

FIGS. 1-2 demonstrate an aspect of the MEMS-based display that emphasizes the strategic orientation of the pixels on displays 102 and 202 to optimize the viewing experience and/or privacy of each user. In the configuration of the displays 102 and 202 in FIGS. 1-2, the pixels designated for a respective viewer may be oriented to a viewing angle associated with the viewing position of that respective viewer. Such reciprocal angling helps ensure that each set of pixels is visible only to its intended viewer. By aligning the orientation of the pixels with the opposing viewer's angle, the MEMS-based display effectively minimizes the possible light leakage from pixels intended for a viewer to inadvertently reach other viewers for which the pixels were not intended, minimizes the blocking of nearby pixels, and/or minimizes the difference between viewing angle of the viewing position and a normal direction of an oriented pixel plane.

Figure 3:
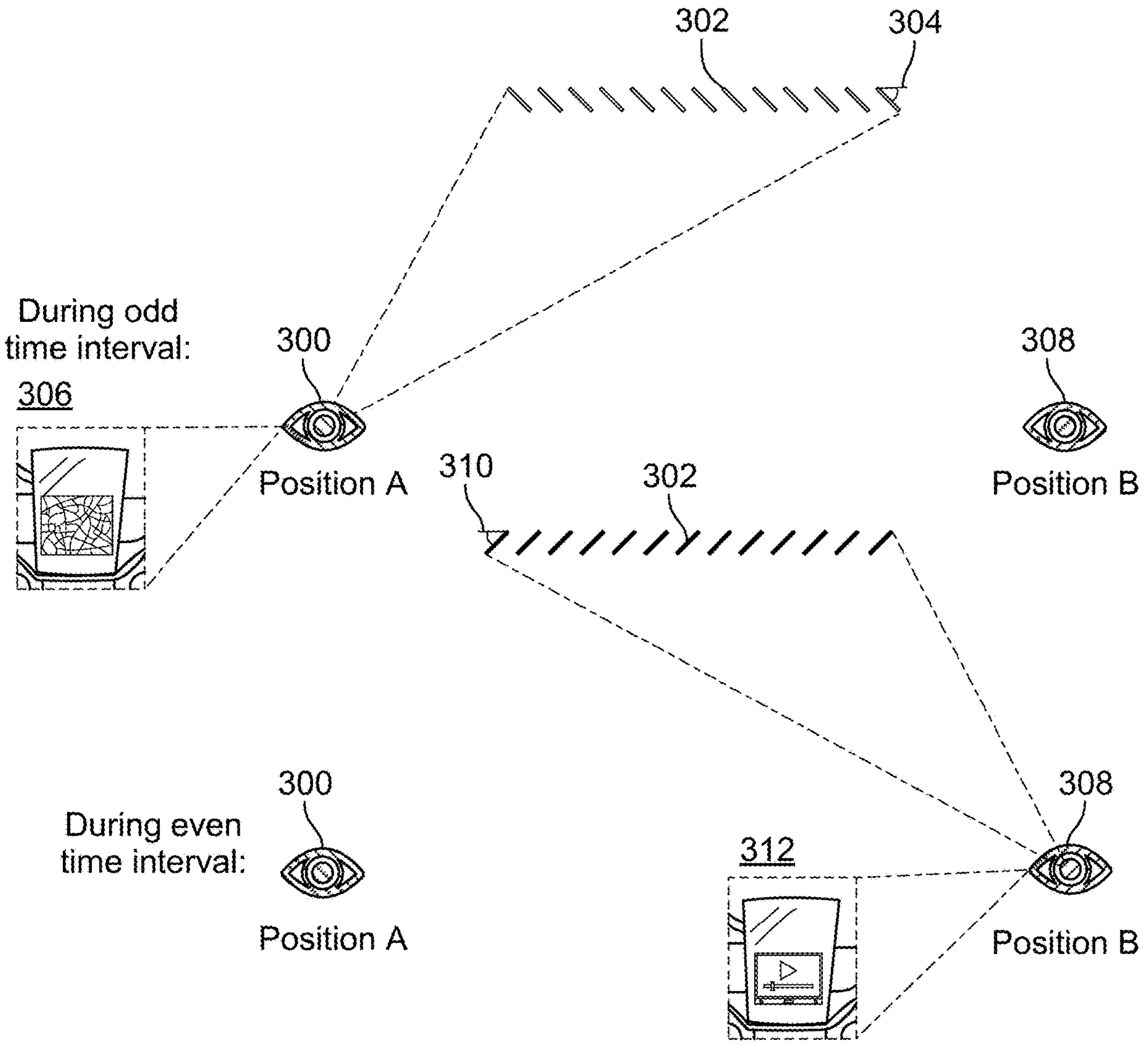
FIG. 3 is a schematic illustration for modifying pixels of a display and presenting different content on the display on a time interval basis, in accordance with some embodiments of this disclosure.

FIG. 3 is a schematic illustration for modifying pixels of a display and presenting different content on the display on a time interval basis, in accordance with some embodiments of this disclosure. In some embodiments, the display controller may set the MEMS-based display to an oscillation mode that causes the pixels of the display to be tilted between at least two orientations at certain time intervals over a particular period of time. For example, in the oscillation mode, two different content items may be presented, one for each respective viewing position (e.g., 110 and 112 of FIG. 1), such that the presentation of each content item is synchronized to the pixels tilting to a pixel orientation for one of the respective viewing positions. For example, during odd time intervals of the particular time period of content presentation, the display controller may tilt pixels 302 to orientation A 304 and cause the pixels to direct presentation of content A 306 towards viewing position A 300. On the other hand, during even time intervals of the particular time period of content presentation, the display controller may tilt pixels 302 to orientation B 310 and cause the pixels to direct presentation of content B 312 towards viewing position B 308. By presenting the same content on every pixel during certain time intervals, the oscillation mode may enable the display to present content with full resolution and brightness.

In some embodiments, rather than switching between the presentation of first content and second content on a time interval basis, the display controller causes presentation of each respective content item based on determining the pixels have reached a specific orientation angle associated with a viewing angle of a respective viewing position. For example, the display controller may begin generating for display content A 306 corresponding to viewing position A 300 based on determining that the orientation angle of the pixels moves within a threshold angle of the viewing angle of position A 300. On the other hand, the display controller may begin generating for display content B 312 corresponding to viewing position B 308 based on determining that the orientation angle of the pixels moves within a threshold angle of the viewing angle of viewing position B 308.

In some embodiments, when the displayed content is a video, the frame rate of the content may be limited by the maximum oscillation rate of the MEMS actuators and refresh rate of the MEMS-based display. For example, for a display that can present new images at 120 frames-per-second (FPS), if the MEMS actuators oscillate between two orientations at 120 times per second, each respective viewer sees their content at a maximum of 60 fps from their respective viewing position.

In some embodiments, cameras and/or sensors may be utilized to track the viewing positions of the viewers when the MEMS-based display is set to oscillation mode. By integrating viewer tracking technology, the oscillations of the pixels 302 can be strategically controlled to tilt towards specific viewing angles corresponding to the viewer positions, ensuring that each viewer can see the display clearly and without overlap in content. The user tracking technology may be combined with any suitable embodiment of a mode for the MEMS display as described in this disclosure. In some embodiments, the oscillation mode may be combined with three-dimensional (3D) technology (e.g., stereoscopic or autostereoscopic 3D technology) to make the MEMS-based display a 3D display, to facilitate the provision of 3D content via the MEMS-based display.

Figure 4:
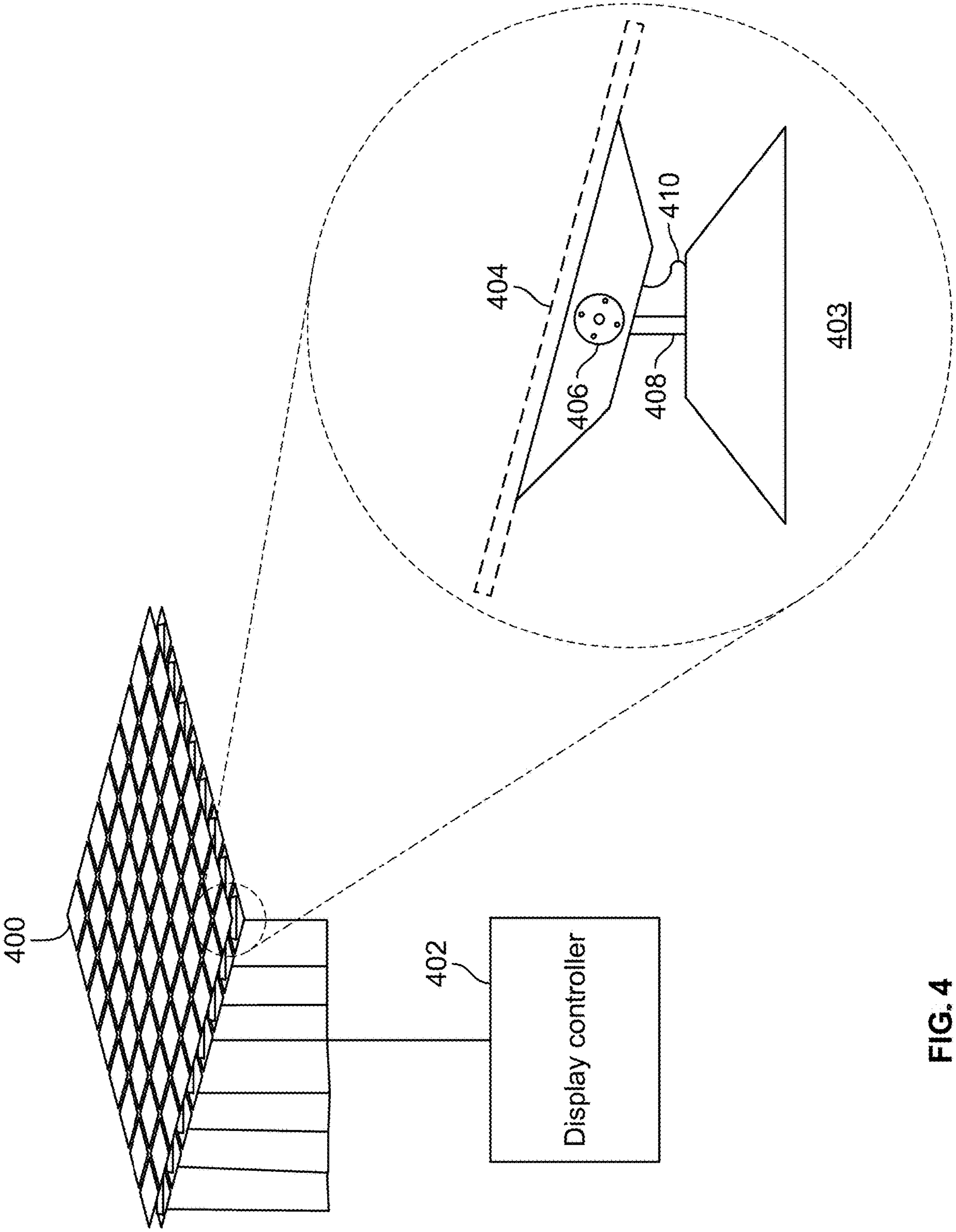
FIG. 4 is an illustrative example for a MEMS actuator connected to a pixel, in accordance with some embodiments of this disclosure.

FIG. 4 is an illustrative example for a MEMS actuator connected to a pixel, in accordance with some embodiments of this disclosure. In some embodiments, the MEMS-based display (e.g., display 102, 202 in FIGS. 1-2) may comprise pixel grid 400. In some embodiments, the pixels of pixel grid 400 may be LCD pixels, LED pixels, micro-LED pixels, OLED pixels, AMOLED pixels, any other suitable pixels, or any combination thereof. Under pixel grid 400, the MEMS-based display may include a layer of MEMS actuators (including MEMS actuator 403) that enable the pixels of pixel grid 400 to tilt to various viewing angles. MEMS actuator 403 may be connected to display controller 402 that sends commands to MEMS actuator 403 to tilt to various orientations. Each respective MEMS actuator may be responsible for tilting a row of pixels, a column of pixels, a diagonal of pixels, a single pixel, any other suitable subsection of pixel grid 400, or any combination thereof. Thus, when tilting pixel subsets (e.g., pixel subsets A 104, 204 and/or pixel subsets B 106, 206 of FIGS. 1-2) towards a particular viewing position, display controller 402 may only send commands to a limited number of MEMS actuators in comparison to the number of pixels (or may send commands to MEMS actuators associated with pixels having a position that is to be maintained indicating that such pixels should not be tilted). For example, display controller 402 may designate (e.g., in the direction viewing mode described with reference to FIG. 1) MEMS actuators of even-numbered columns and/or rows to tilt towards one viewing angle (e.g., one of the viewing angles of viewing positions A 110, 210 of FIGS. 1-2) and designate MEMS actuators of odd-numbered columns/rows to tilt towards another viewing angle (e.g., viewing angle of viewing positions B 112, 212 of FIGS. 1-2).

MEMS actuator 403 may include tilting component 406 (e.g., a rotary actuator or other suitable tilting component), signal component 410 (e.g., a pliable wire, or other wired or wireless component to transmit a signal, or other suitable tilting component), and MEMS rod 408. In some embodiments, pixel subset 404 may be integrated above MEMS actuator 403. In some embodiments, one or more portions of MEMS actuator 403 may be mounted on a MEMS substrate. Pixel subset 404 may be a single pixel or a subset of pixels such as one or more rows, columns, diagonals, or any other suitable subset. In some embodiments, MEMS actuator 403 may be an electrostatic actuator, thermal actuator, piezoelectric actuator, electromagnetic actuator, shape memory alloy (SMA) actuator, magnetic shape memory (MSM) actuator, electromechanical actuator, optical actuator, or any other suitable MEMS actuator, or any combination thereof. The manner by which tilting component 406 causes the pixel to tilt can therefore function under a wide range of mechanisms such as hinging, bending, rotating, sliding, any other suitable mechanism, or any combination thereof. Tilting component 406 may cause pixels to tilt to any suitable tilting angle, e.g., 45 degrees or 60 degrees, relative to a viewing position. Signal component 410 may provide the signal to MEMS actuator 403 that causes MEMS actuator 403 to tilt pixel subset 404 to a particular orientation. Signal component 410 may be a pliable wire, an electromagnetic field, a light source, a heat source, any other suitable signal component, or any other combination thereof, that can transmit the signal to MEMS actuator 403 to move to a particular orientation. In some embodiments, the signal component 410 is designed to accommodate dynamic movements of the pixels, e.g., tilting actions in different viewing modes. In some embodiments, the flexibility of pliable wires may help to ensure that electrical connectivity is maintained without hindering the pixels' ability to tilt freely.

In some embodiments, MEMS rod 408 may be included under pixel subset 404 to enable vertical movement of pixel subset 404 so that it can be better aligned for providing an optimized viewing experience. For example, when a user views content on the MEMS-based display from an angle, the tilted pixels farthest away from the user may be obstructed by the pixels closer to the user. The MEMS actuators of the pixels farther away may therefore activate their respective MEMS rods 408 to adjust their vertical height upwards thus making them more visible from the user's perspective.

Figure 5:
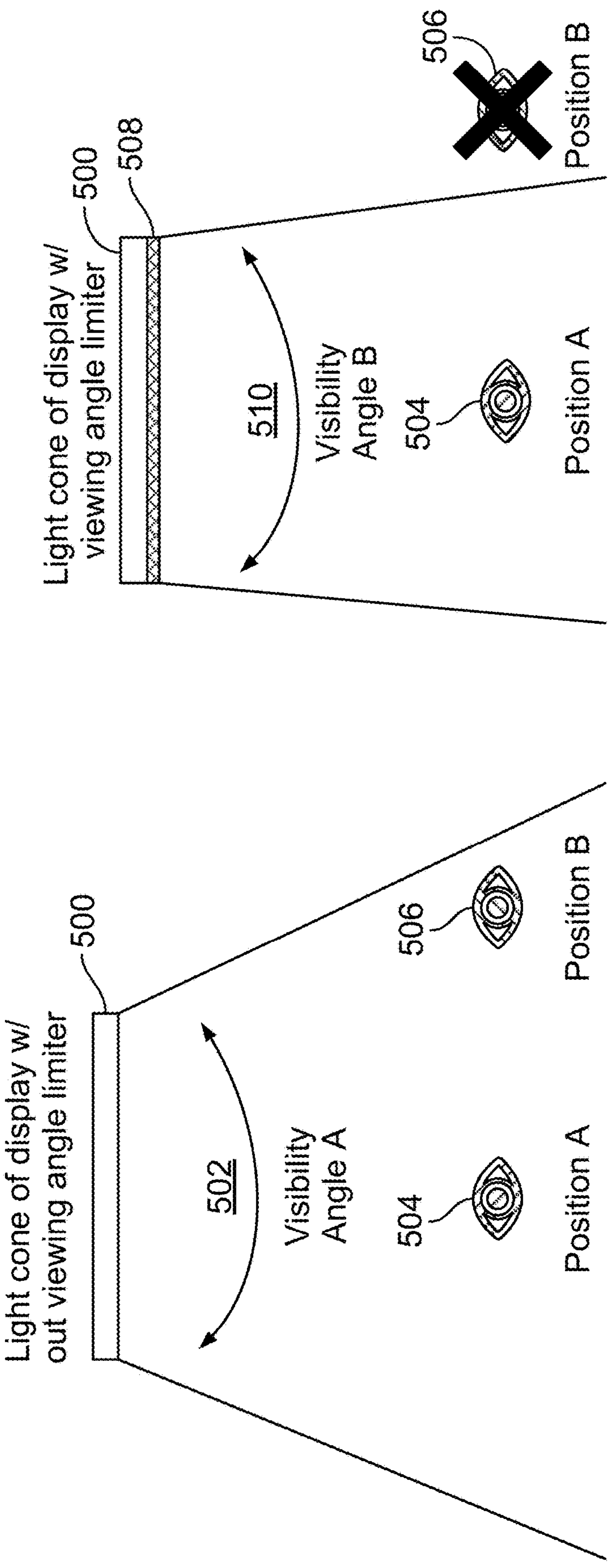
FIG. 5 is an illustrative example for a display implemented with a viewing angle limiter, in accordance with some embodiments of this disclosure.

FIG. 5 is an illustrative example for a display implemented with a viewing angle limiter, in accordance with some embodiments of this disclosure. In some embodiments, the display (e.g., display 102, 202 in FIGS. 1-2) may be equipped with an additional hardware layer over the pixel grid (e.g., pixel grid 400 of FIG. 4) that limits the viewing angles from which the content is visible. In some embodiments, one or more pixels of the display may be equipped with an optical retarder layer, lenticular lenses, directional backlights, any other suitable viewing angle limiter, or any combination thereof. For example, an optical retarder is a device that alters the polarization state of light passing through it. By incorporating the optical retarder onto the display, the display can manipulate the direction and polarization of light to create a more defined and narrower range of available viewing angles. The viewing angle limiters may be individually implemented on each individual pixel, on subsets of the pixel grid, or on the entire pixel grid.

As shown by the visibility angle A 502 of display 500, the light cone of a display without a viewing angle limiter may be wide enough to be visible at both viewing position A 504 and viewing position B 506. As referred to herein, "light cone," represents the angular distribution of light emitted from a pixel and/or display. The light cone of a pixel and/or display therefore determines the range of viewing angles over which the pixel's and/or display's light is effectively visible. The MEMS-based display causing different content to be directed to different viewing angles may enable each respective content item to be visible only to the viewing position it was requested for (or to otherwise obscure the view with respect to certain other viewing angles). For example, viewing position A 504 and viewing position B 506 may be adjacent to (or within a minimum distance/angular separation of) each other within a shared viewing environment. If a person at viewing position A 504 requests to view a content item and a person at viewing position B 506 requests to view another content item, a display may leak light between viewing position A and viewing position B due to their close proximity, thus causing blurry and incoherent images for users at both viewing positions. As shown by visibility angle B 510 of display 500, an implemented viewing angle limiter 508 may minimize or prevent light leaking between adjacent viewing positions by narrowing the light cone of the display. With viewing angle limiter 508 integrated onto display 500, a user at viewing position A 504 can see the content on the screen, but a user at viewing position B 506 may not since their viewing angle is outside the range of visibility angle B 510. The implementation of a viewing angle limiter such as a retarder layer, therefore assists in directing the light from the pixels to each viewer without interference of light emitted from the pixel subsets. In some embodiments, there is sufficient separation between the viewing angles of the viewing positions to inherently minimize the interference of light between the pixel subsets, therefore enabling the display to simultaneously present clear content to different users without an implemented viewing angle limiter.

In a shared viewing environment such as, for example, a vehicle interior, directing the light emitted by a particular pixel of the display to the correct viewer may be particularly important. If, for example, the display is in the directional viewing mode and a driver requests navigation information, it is desirable for the driver to be provided with a visual output of the navigation information clearly, e.g., without receiving any interference (or significant interference) from other content such as video entertainment being shown to passengers in other viewing positions of the vehicle. The viewing angle limiter therefore may help ensure that, in the directional viewing mode, each viewer of the display sees only (or primarily sees only) the content intended for them, even though each viewer is looking at the same screen of the MEMS-based display. In some embodiments, the display with the viewing angle limiter may be combined with 3D technology (e.g., stereoscopic or autostereoscopic 3D technology) to make the MEMS-based display a 3D display, to facilitate the provision of 3D content via the MEMS-based display.

Figure 6:
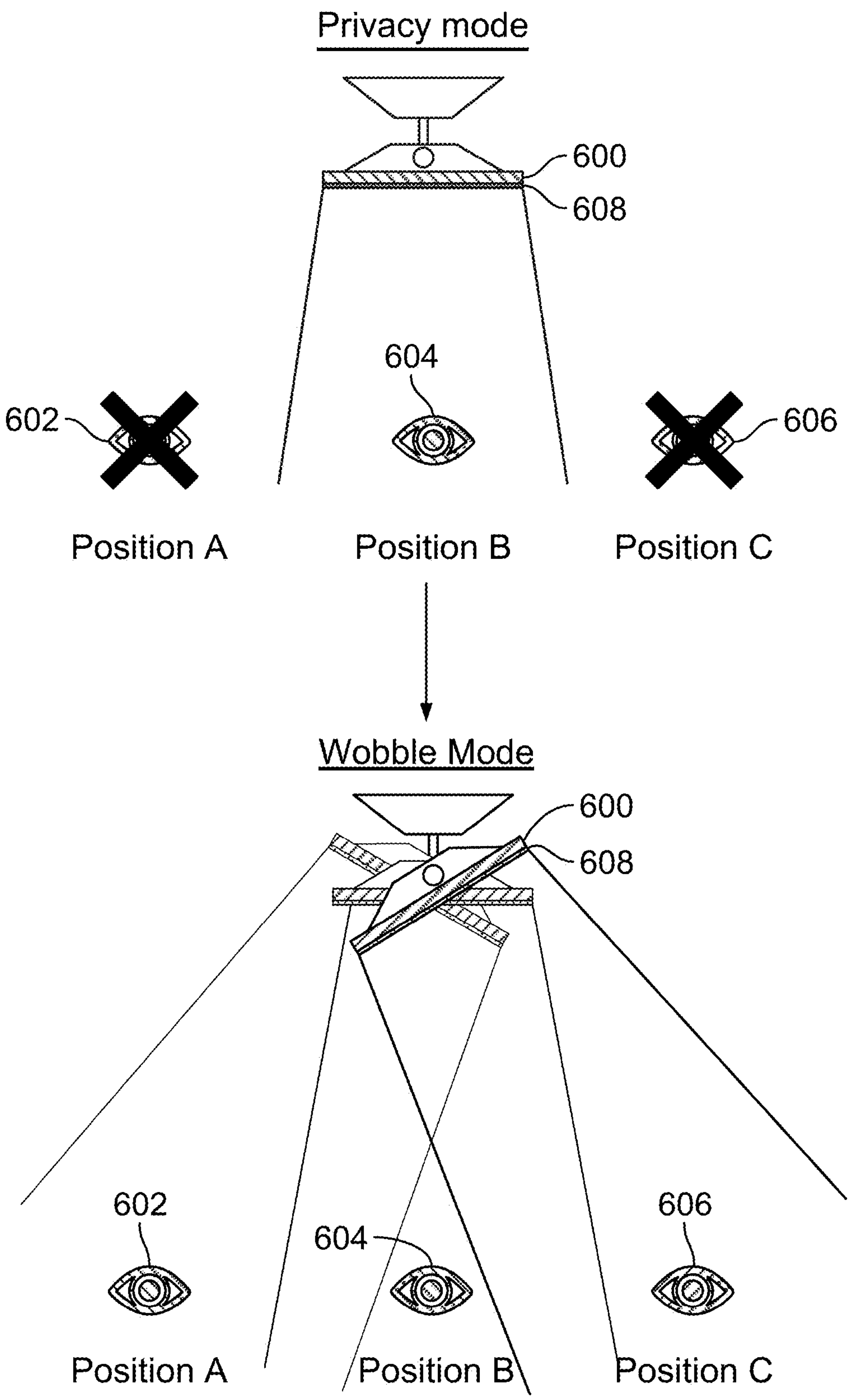
FIG. 6 is a schematic illustration for a pixel with an implemented viewing angle limiter being modified to a privacy mode and wobble mode, in accordance with some embodiments of this disclosure.

FIG. 6 is a schematic illustration for a pixel with an implemented viewing angle limiter being modified to a privacy mode and standard mode, in accordance with some embodiments of this disclosure. As described in relation to FIGS. 1-2, the display controller may set the MEMS-based display to a standard mode such that pixels of the display are oriented to a flat position. Without a viewing angle limiter, standard mode enables users to use the MEMS-based display like a conventional display by making content shown by the display visible to a wide range of viewing angles. In some embodiments, the MEMS-based display may include a viewing angle limiter, which prevents the display from acting like a conventional display if the pixels are at a flat orientation. For example, pixel 600 is set to a flat orientation and has viewing angle limiter 608 implemented over it. By limiting the visibility angle of the pixel, the viewing angle limiter causes the light from pixel 600 to be visible only from the viewing angle of position B even though the pixel has a flat orientation. Users looking at the pixel from Position A 602 and Position B 606 are at viewing angles that are outside of the range of the visibility angle of the pixel and cannot perceive the emitted light from the pixel. A mode in which the pixels are set to a flat orientation may, therefore, be called a privacy mode if the respective display includes a viewing angle limiter. In privacy mode, only viewers located at a portion with a viewing angle relative to the display that is within a threshold angle of the normal vector of the plane may see what is shown on the display. The threshold angle may be defined by one or more properties of the viewing angle limiter implemented on the display. Privacy mode may be particularly useful when the display is used in a shared environment that would benefit from providing privacy for certain information.

In some embodiments, to achieve the functionality of the standard mode of a MEMS-based display without a viewing angle limiter, a MEMS-based display with a viewing angle limiter may enter a wobble mode, as indicated in the lower portion of FIG. 6. In the wobble mode, the display controller may rapidly oscillate the MEMS actuators, thus causing the pixels to wobble through a wide range of orientations. Wobbling pixel 600 causes light from pixel 600 to be visible to a wider range of viewing angles, thus allowing the display to act like a conventional display even if viewing angle limiter 608 is implemented. For example, the display controller may direct pixel 600 towards position A 602, position B 604, and position C 606 at least once in the span of a single wobble oscillation, thus causing content shown by pixel 600 to be visible from every viewing angle of the three positions. For someone viewing content from any of position A 602, position B 604, and position C 606, they would perceive content on the display with wobbling pixels in the same manner or at least substantially close to the same manner they do on a display with flat pixels.

In some embodiments, cameras and/or sensors may be utilized to track the viewing positions of the viewers when the MEMS-based display is set to wobble mode. By integrating viewer tracking technology, the wobbling can be strategically controlled to wobble towards specific viewing angles, helping to ensure that all viewers can see the display clearly and without overlap in content. In some embodiments, the frame rate of a content item may be limited by the maximum oscillation rate of the MEMS actuators and the refresh rate of the MEMS-based display.

FIGS. 7A-7D is an illustrative example of segmenting and orienting pixel regions of the MEMS-based display to specific viewing positions, in accordance with some embodiments. In some embodiments, it may be desirable to segment and tilt pixel regions of the MEMS-based display (e.g., display 102, 202 of FIGS. 1-2, respectively) with respect to one or more users, such that content from each pixel region is visible only to a specific viewer(s). Such a mode may be referred to herein as "spatial display mode." As referred to herein, "pixel region" refers to an area of the display such as a quadrant, segment, slice, zone, or any other suitable term for an area or portion of the display. By utilizing spatial display mode, the MEMS-based display may open up new possibilities for providing privacy-centric applications and interactive gaming to users.

The illustrative example of FIGS. 7A-7D demonstrates how spatial display mode may have advantageous uses in a gaming format. For example, users may utilize display 701 to play a game of virtual poker (or dice, scrabble, any other suitable game, or other suitable interactive content). In some embodiments, the MEMS-based display may be setup in a vertical orientation. In some embodiments, the MEMS-based display may be setup in a horizontal orientation like a tabletop to emulate, e.g., a gaming table. When the poker game is active, the display controller may instruct the MEMS actuators to set the pixel grid to spatial display mode, which causes the display to be divided into player region A 702, player region B 706, player region C 710, player region D 712, and play region 704.

Each region of display 701 in spatial display mode may be configured differently. For example, the display controller may orient pixels of player region A 702 towards the viewing angle of position A 700, such that content from the pixel region visible only by a user located at position A 700. Player region A 702 may therefore show content that a player viewing the specific region may want to keep secret from other players, e.g., their hand of cards in poker. The display controller may configure play region 704 so that it is visible to all participants of the game. In some embodiments, in the case that display 701 does not have an implemented viewing angle limiter, the display controller sets the pixels of play region 704 to the standard mode as described in relation to FIGS. 1-2. In some embodiments, in the case that display 701 does have an implemented viewing angle limiter, the display controller set the pixels of play region 704 to wobble mode as described in relation to FIG. 6.

Figures 7A, 7B, 7C, 7D:
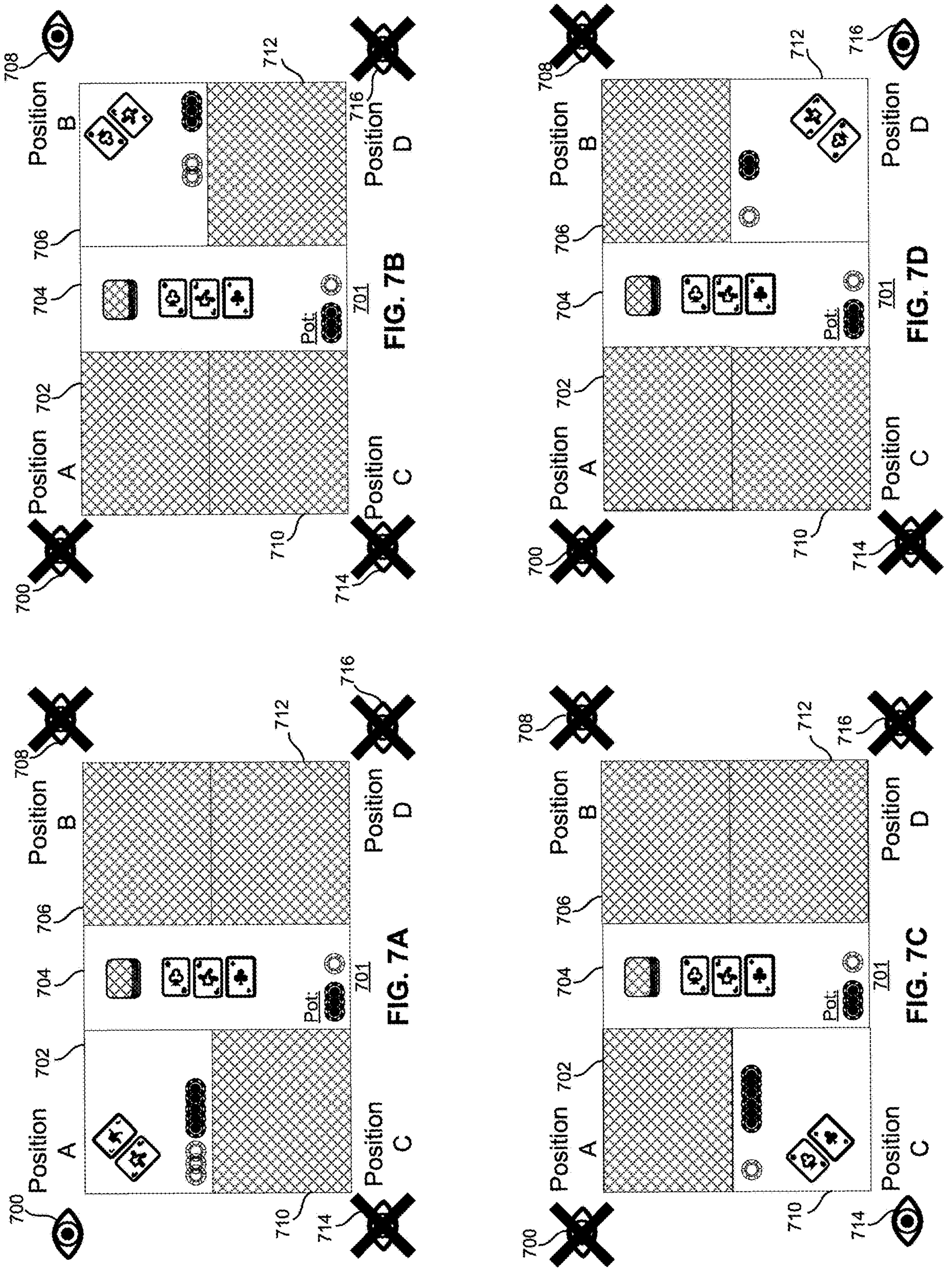
FIGS. 7A-7D show illustrative examples of segmenting and orienting pixel regions of a MEMS-based display to specific viewing positions, in accordance with some embodiments of this disclosure.

Since play region 704 is visible for all participants of the game, play region 704 may display content related to the game that is relevant to all players, e.g., the community cards and pot in a poker game. FIG. 7A thus shows how content shown by display 701 may look from the perspective of position A 700. A viewer at position A 700 may view private information (e.g., a poker hand) displayed by player region A 702 without viewers at position B 708, position C 714 and position D 716 being able to see the private information even though the viewers may be sitting across from one another. While the viewer at position A 700 can see the content shown by player region A 702 and play region 704, they do not see any light emitted from pixels of display 701 directing light towards player region B 706, player region C 710, or player region D 712 since pixels of display 701 associated with those player regions are directed towards other viewing positions. On the other hand, FIG. 7B shows how content of the MEMS-based may appear from the perspective of position B 708. Just like the viewer at position A 700, a viewer at position B 708 may view private content from their region without viewers in other viewing positions being able to see such private content. The viewer at position B 708 may see content from player region B 706 and play region 704, but content from any other regions remains obscured to the viewer since they do not receive any light emitted from those areas. FIGS. 7C-7D demonstrate how the display may also be configured to provide a private gaming view to viewers at position C 714 and position D 716. Just like the viewers of position A 700 and position B 708, viewers at position C 714 and position D 716 can see their own player region and play region 704 while the rest of the display is obscured from their viewing angle.

In some embodiments, some player regions may not have a corresponding player and may, therefore, be in an inactive mode. In some embodiments, when in inactive mode, pixels of the respective inactive player region present an indicator that the player region is available for use. In some embodiments, when in the inactive mode, pixels of the respective inactive player region are turned off or present a blank image.

In some embodiments, spatial display mode may be combined with multiple other modes and features of display 701 such as directional viewing mode, oscillation mode, an implemented viewing angle limiter, wobble mode, or any other described mode and feature. For example, the display controller may set the private player regions to oscillation mode or directional viewing mode. This combination of modes may enable display 701 to show the private content to the viewer of the respective player region while simultaneously displaying an indicator to the other players that the respective player region is a private region of the screen for the respective viewer at the respective viewing position.

In some embodiments, cameras and/or sensors may be utilized to track the viewing positions of the viewers when display 701 is set to spatial display mode. By integrating viewer tracking technology with the spatial display mode, the pixels of each player region can be precisely tilted to be visible only within a narrow viewing angle. This may ensure that only a specific viewer assigned to a respective player region is able to view the contents of the player region. In some embodiments, the spatial display mode may be combined with 3D technology (e.g., stereoscopic or autostereoscopic 3D technology) to make the MEMS-based display a 3D display.

Figure 8:
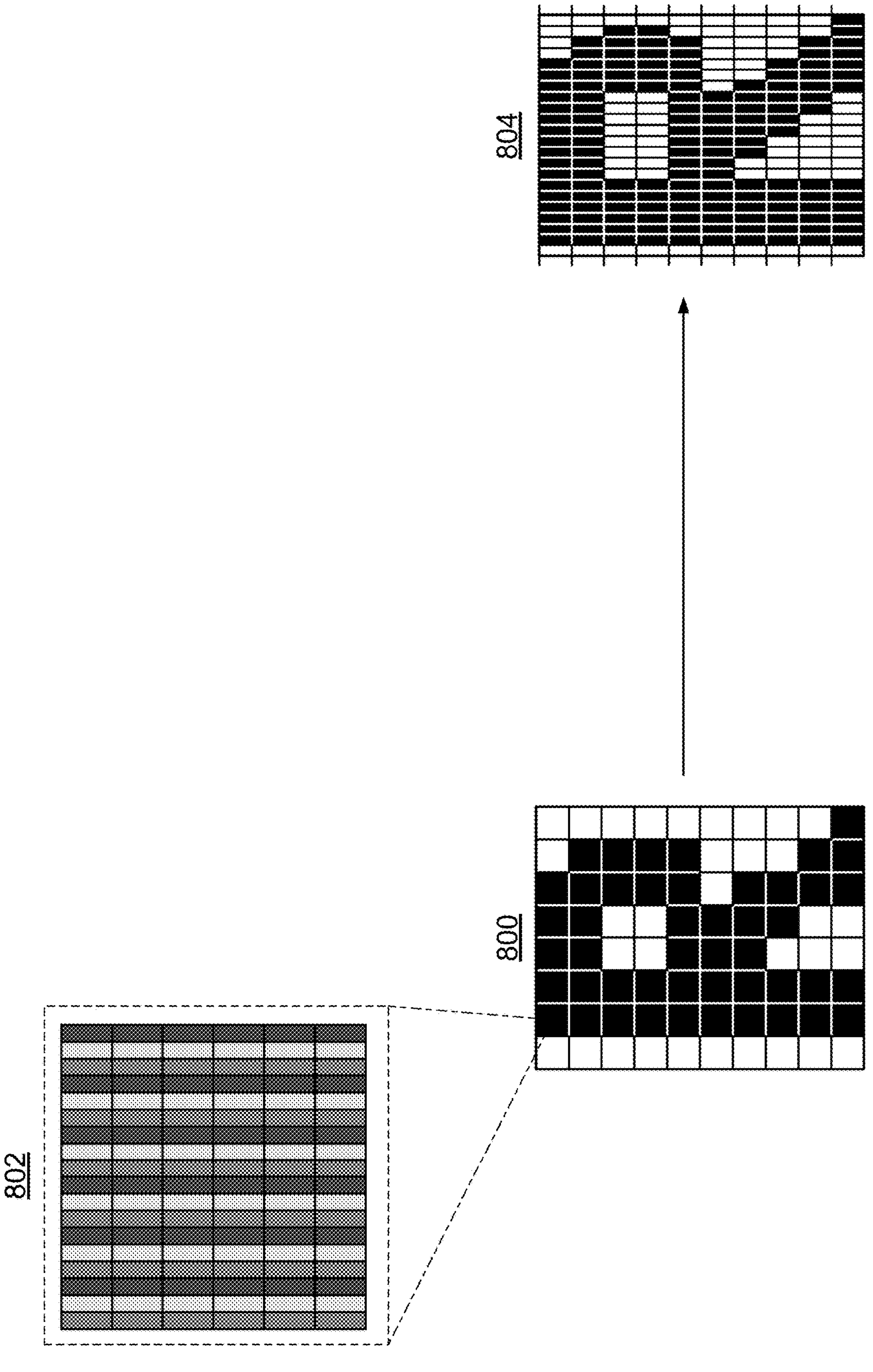
FIG. 8 is a schematic illustration for performing sub-pixel rendering from a modified pixel orientation, in accordance with some embodiments of this disclosure.

FIG. 8 is a schematic illustration for performing sub-pixel rendering from a modified pixel orientation, in accordance with some embodiments of this disclosure. In some embodiments, each pixel may comprise sub-pixels (e.g., RGB or RGBW sub-pixels or any other suitable embodiment of sub-pixels). The display may render content using pixel rendering. For example, pixel grid 800 demonstrates how the letter "R" may be displayed using pixel rendering. Pixel grid 800 may be in the standard mode, directional viewing mode, oscillation mode, or any other suitable display mode. Pixel grid 800 may be made up of sub-pixel grid 802. When displaying content using pixel rendering, each set of sub-pixels corresponding to a pixel may be configured to collectively render one color.

In some embodiments, the display may render content using sub-pixel rendering. For example, pixel grid 804 demonstrates how the letter "R" may be displayed using sub-pixel rendering. Pixel grid 804 may be in standard mode, directional viewing mode, oscillation mode, or any other suitable display mode. By performing sub-pixel rendering, the display can present content with smoother edges and reduced jaggedness caused by pixelation. In some embodiments, sub-pixels may be used to render text, as sub-pixel rendering may significantly increase the readability of fonts presented with emboldening and italicizing. The "R" shown by pixel grid 804, for example, is more recognizable to be an "R" than the "R" rendered by pixel grid 800 using pixel rendering. In some embodiments, the display may include sub-pixel filters that may be implemented based on different pixel arrangements of the display to achieve sub-pixel rendering. By enabling the display to perform sub-pixel rendering, the MEMS-based display can consistently display clear images even if the sub-pixels may be tilted away from their flat orientation. In some embodiments, the MEMS actuators may be configured to tilt each sub-pixel individually, thereby enabling the display controller to split sub-pixels of a single pixel between two different orientations.

Figure 9:
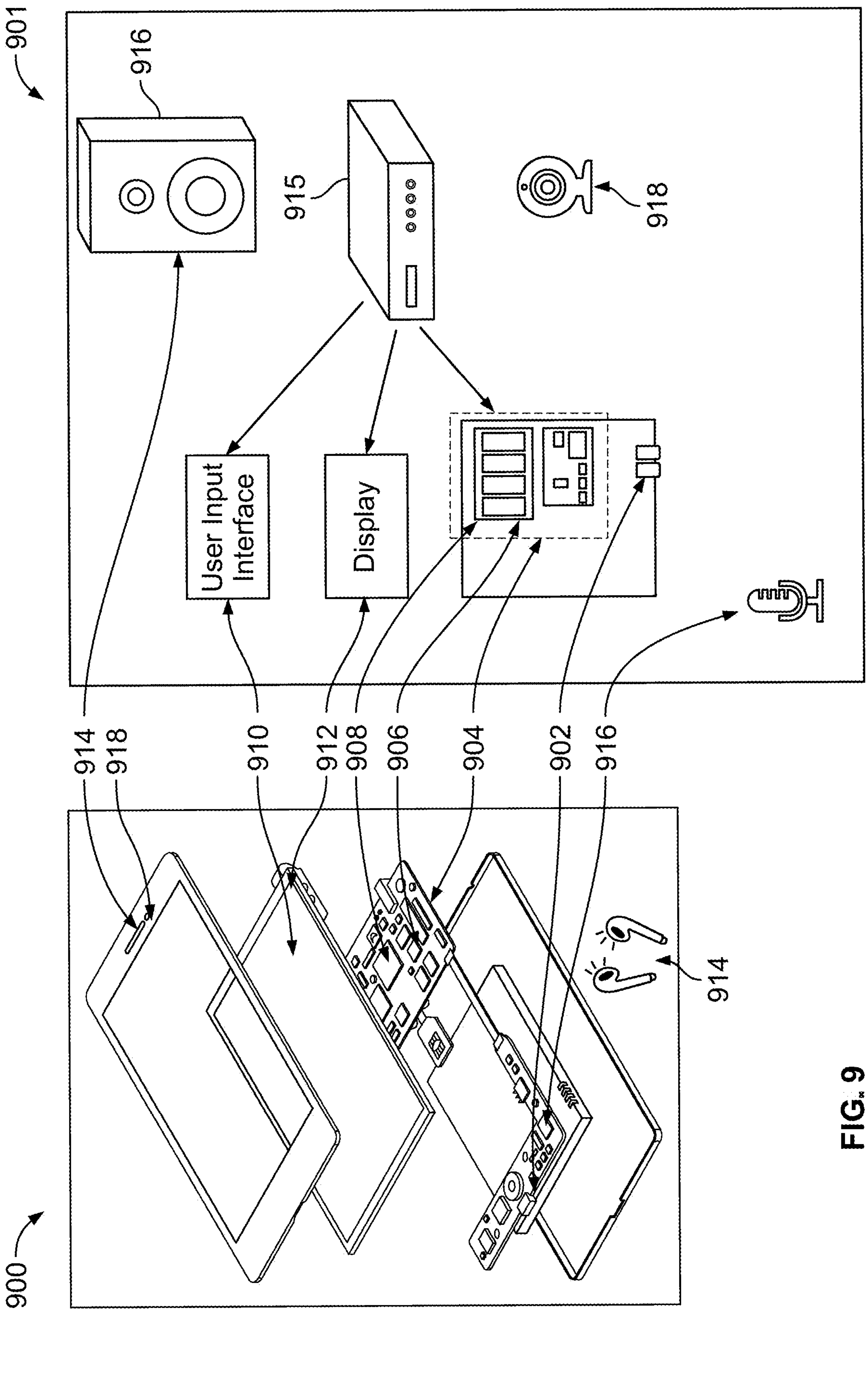
FIGS. 9-10 show illustrative devices and systems that may comprise the MEMS-based display, in accordance with some embodiments of this disclosure.
Figure 10:
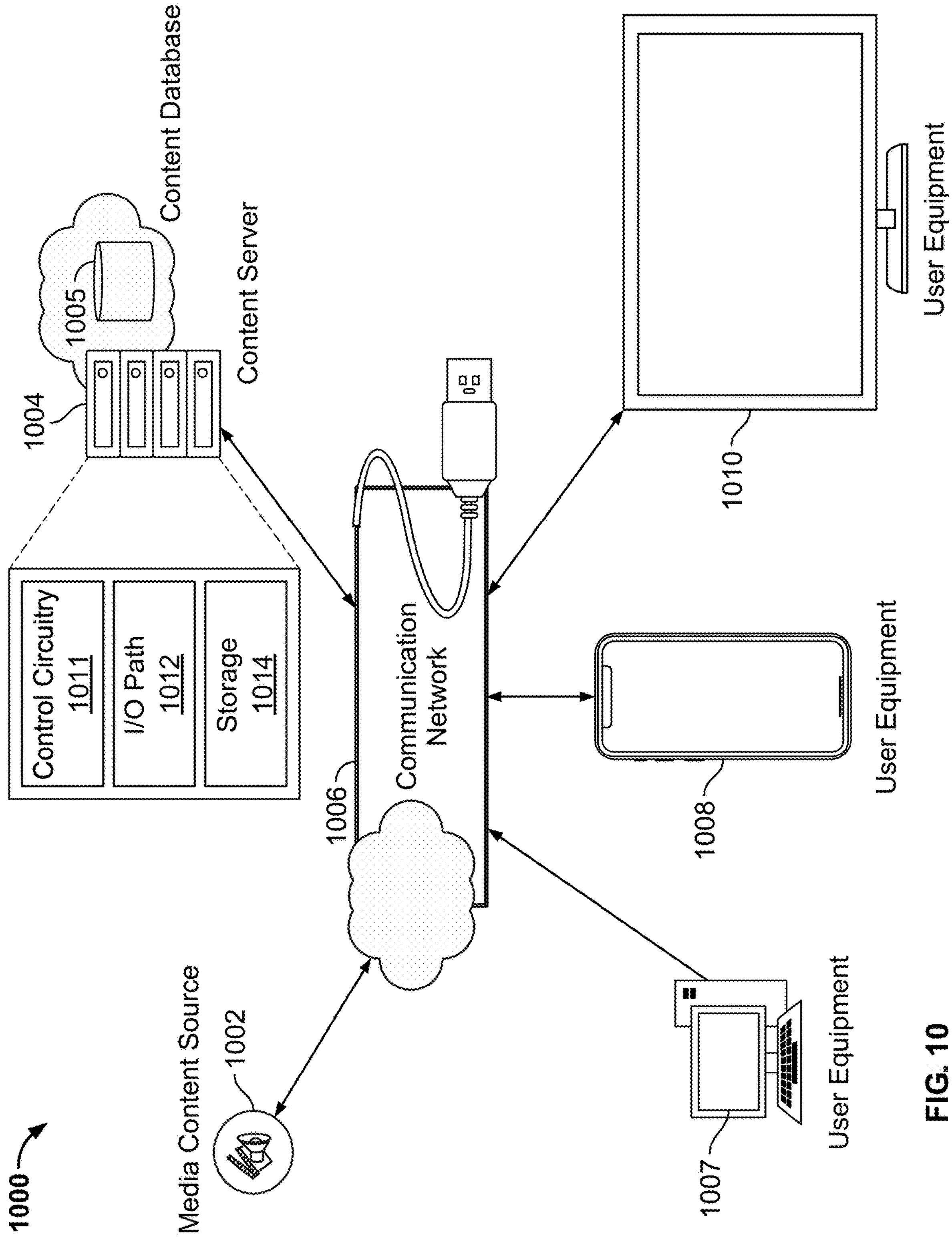

FIGS. 9-10 is illustrative devices, systems, servers, and related hardware for a MEMS-based display, in accordance with some embodiments of this disclosure. FIG. 9 shows generalized embodiments of illustrative computing devices 900 and 901, which may correspond to, e.g., the computing device of vehicle dashboard 101 of FIG. 1 and the gaming surface of FIGS. 7A-7D. For example, computing device 900 may be: a camera; a smartphone device; a tablet; a near-eye display device; a VR or AR device; a head-mounted computing device; a mobile device; or any other suitable device which may have the integrated MEMS-based display; or any combination thereof. In another example, computing device 901 may be a user television equipment system or device. Computing device 901 may include set-top box 915. Set-top box 915 may be communicatively connected to microphone 915, audio output equipment (e.g., speaker or headphones 915), and display 912. In some embodiments, microphone 916 may receive audio corresponding to a voice of a video conference participant and/or ambient audio data during a video conference. In some embodiments, display 912 may be the MEMS-based display. In some embodiments, set-top box 915 may be communicatively connected to user input interface 910. In some embodiments, user input interface 910 may be a remote control device. Set-top box 915 may include one or more circuit boards. In some embodiments, the circuit boards may include control circuitry, processing circuitry, and storage (e.g., RAM, ROM, hard disk, removable disk, etc.). In some embodiments, the circuit boards may include an input/output path. More specific implementations of computing devices are discussed below in connection with FIG. 10. In some embodiments, computing device 900 may comprise any suitable number of sensors (e.g., gyroscope or gyrometer, or accelerometer, etc.), and/or a GPS module (e.g., in communication with one or more servers and/or cell towers and/or satellites) to ascertain a location of computing device 900. In some embodiments, computing device 900 comprises a rechargeable battery that is configured to provide power to the components of the computing device.

Each one of computing device 900 and computing device 901 may receive content and data via input/output (I/O) path 902. I/O path 902 may provide content (e.g., broadcast programming, on-demand programming, Internet content, content available over a local area network (LAN) or wide area network (WAN), and/or other content) and data to control circuitry 904, which may comprise processing circuitry 906 and storage 908. Control circuitry 904 may be used to send and receive commands, requests, and other suitable data using I/O path 902, which may comprise I/O circuitry. I/O path 902 may connect control circuitry 904 (and specifically processing circuitry 906) to one or more communications paths (described below). I/O functions may be provided by one or more of these communications paths, but are shown as a single path in FIG. 9 to avoid overcomplicating the drawing. While set-top box 915 is shown in FIG. 9 for illustration, any suitable computing device having processing circuitry, control circuitry, and storage may be used in accordance with the present disclosure. For example, set-top box 915 may be replaced by, or complemented by, a personal computer (e.g., a notebook, a laptop, a desktop), a smartphone (e.g., computing device 900), an AR or VR device, a tablet, a network-based server hosting a user-accessible client device, a non-user-owned device, any other suitable device, or any combination thereof. In some embodiments, display controller 402 of FIG. 4 may correspond to control circuitry 904 of FIG. 9 and/or control circuitry 1011 of FIG. 10.

Control circuitry 904 may be based on any suitable control circuitry such as processing circuitry 906. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, control circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 904 executes instructions for the MEMS-based display by instructing the display to enter specific modes stored in memory (e.g., storage 908). Specifically, control circuitry 904 may be instruct the MEMS-based display to perform the functions discussed above and below.

In client/server-based embodiments, control circuitry 904 may include communications circuitry suitable for communicating with a server or other networks or servers. In some embodiments, control circuitry 904 executes instructions based on a display mode application. The display mode application may be a stand-alone application implemented on a computing device or a server. The display mode application may be implemented as software or a set of executable instructions. The instructions for performing any of the embodiments discussed herein of the display mode application may be encoded on non-transitory computer-readable media (e.g., a hard drive, random-access memory on a DRAM integrated circuit, read-only memory on a BLU-RAY disk, etc.). For example, in FIG. 9, the instructions may be stored in storage 908, and executed by control circuitry 904 of a computing device 900.

In some embodiments, the display mode application may be a client/server application where only the client application resides on computing device 900 (e.g., vehicle dashboard 101 of FIG. 1), and a server application resides on an external server (e.g., server 1004 of FIG. 10). For example, the display mode application may be implemented partially as a client application on control circuitry 904 of computing device 900 and partially on server 1004 as a server application running on control circuitry 1011. Server 1004 may be a part of a local area network with one or more of computing devices 900, 901 or may be part of a cloud computing environment accessed via the Internet. In a cloud computing environment, various types of computing services for performing searches on the Internet or informational databases, providing video communication capabilities, providing storage (e.g., for a database) or parsing data are provided by a collection of network-accessible computing and storage resources (e.g., server 1004 and/or an edge computing device), referred to as "the cloud." Computing device 900 may be a cloud client that relies on the cloud computing capabilities from server 1004 to determine what display mode to set the MEMS-based display to based on received inputs or determinations regarding the content that is displayed. When executed by control circuitry of server 1004, the video capture application may instruct control circuitry 911 to perform such tasks. The client application may instruct control circuitry 904 to perform such tasks.

Control circuitry 904 may include communications circuitry suitable for communicating with a video communication or video conferencing server, content servers, social networking servers, video gaming servers, edge computing systems and devices, a table or database server, or other networks or servers. The instructions for carrying out the above mentioned functionality may be stored on a server (which is described in more detail in connection with FIG. 10). Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths (which is described in more detail in connection with FIG. 10). In addition, communications circuitry may include circuitry that enables peer-to-peer communication of computing devices, or communication of computing devices in locations remote from each other (described in more detail below).

Memory may be an electronic storage device provided as storage 908 that is part of control circuitry 904. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 908 may be used to store various types of content described herein as well as viewer location data as described above. Nonvolatile memory may also be used (e.g., to launch a boot-up routine and other instructions). Cloud-based storage, described in relation to FIG. 9, may be used to supplement storage 908 or instead of storage 908.

Control circuitry 904 may include video generating circuitry and tuning circuitry, such as one or more analog tuners, one or more MPEG-2 decoders or MPEG-2 decoders or decoders or HEVC decoders or any other suitable digital decoding circuitry, high-definition tuners, or any other suitable tuning or video circuits or combinations of such circuits. Encoding circuitry (e.g., for converting over-the-air, analog, or digital signals to MPEG or HEVC or any other suitable signals for storage) may also be provided. Control circuitry 904 may also include scaler circuitry for upconverting and down converting content into the preferred output format of computing device 900. Control circuitry 904 may also include digital-to-analog converter circuitry and analog-to-digital converter circuitry for converting between digital and analog signals. The tuning and encoding circuitry may be used by computing device 900, 901 to receive and to display, to play, or to record content. The tuning and encoding circuitry may also be used to receive video communication session data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 908 is provided as a separate device from computing device 900, the tuning and encoding circuitry (including multiple tuners) may be associated with storage 908.

Control circuitry 904 may receive instruction from a user by way of user input interface 910. User input interface 910 may be any suitable user interface, such as a remote control, mouse, trackball, keypad, keyboard, touch screen, touchpad, stylus input, joystick, voice recognition interface, or other user input interfaces. Display 912 may be provided as a stand-alone device or integrated with other elements of each one of computing device 900 and computing device 901. For example, display 912 may be a touchscreen or touch-sensitive display. Display 912 may be the MEMS-based display. In such circumstances, user input interface 910 may be integrated with or combined with display 912. In some embodiments, user input interface 910 includes a remote-control device having one or more microphones, buttons, keypads, or any other components configured to receive user input or combinations thereof. For example, user input interface 910 may include a handheld remote-control device having an alphanumeric keypad and option buttons. In a further example, user input interface 910 may include a handheld remote-control device having a microphone and control circuitry configured to receive and identify voice commands and transmit information to set-top box 915.

Audio output equipment 914 may be integrated with or combined with display 912. Display 912 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card or graphical processing unit (GPU) may generate the output to display 912. Audio output equipment 914 may be provided as integrated with other elements of each one of computing device 900 and computing device 901 or may be stand-alone units. An audio component of videos and other content displayed on display 912 may be played through speakers (or headphones) of audio output equipment 914.

In some embodiments, audio output equipment 914 may correspond to a particular viewing position or content selected for display. For example, display 912 may be set to directional viewing mode as described in relation to FIG. 1. In such a case it may be stored in memory that audio output equipment 914 is associated with a passenger position (i.e., viewing position B 112 of FIG. 1). When content is displayed towards the respective passenger position, control circuitry may only output the content audio using audio output equipment 914 based on retrieving the stored association between the passenger position and audio output equipment 914. While audio output equipment 914 plays audio for content directed to a passenger, another audio output equipment connected to the display may play different audio for another content directed to another passenger or driver of the vehicle. By selectively outputting audio to certain viewing positions, it ensures that viewers using the same display to generate multiple pieces of content simultaneously get the audio corresponding to the content directed to them. In some embodiments, control circuitry may associate an audio output equipment with a particular viewing position and/or generated content based on using spatial data retrieved from camera 918. For example, if audio output equipment 914 is, e.g., headphones, spatial data may indicate that audio output equipment 914 is being worn by a user in a particular passenger position viewing a particular content. Control circuitry may thus subsequently store in memory that audio output equipment 914 is associated with the particular passenger position and/or the particular content based on the spatial data.

In some embodiments, audio may be distributed to a receiver (not shown), which processes and outputs the audio via speakers of audio output equipment 914. In some embodiments, for example, control circuitry 904 is configured to provide audio cues to a user, or other audio feedback to a user, using speakers of audio output equipment 914. There may be a separate microphone 916 or audio output equipment 914 may include a microphone configured to receive audio input such as voice commands or speech. For example, a user may speak letters or words that are received by the microphone and converted to text by control circuitry 904. In a further example, a user may voice commands that are received by a microphone and recognized by control circuitry 904. Camera 918 may be any suitable video camera integrated with the equipment or externally connected. Camera 918 may be a digital camera comprising a charge-coupled device (CCD) and/or a complementary metal-oxide semiconductor (CMOS) image sensor. In some embodiments, camera 919 may be an analog camera that converts to digital images via a video card. In some embodiments, control circuitry 904 may receive data collected from camera 918 to determine viewing positions and viewing angles of users around display 912.

The display mode application may be implemented using any suitable architecture. For example, it may be a stand-alone application wholly implemented on each one of computing device 900 and computing device 901. In such an approach, instructions of the application may be stored locally (e.g., in storage 908), and data for use by the application is downloaded on a periodic basis (e.g., from an out-of-band feed, from an Internet resource, or using another suitable approach). Control circuitry 904 may retrieve instructions of the application from storage 908 and process the instructions to set the pixels of the MEMS-based display to a particular display mode. Based on the processed instructions, control circuitry 904 may determine what action to perform when input is received from user input interface 910. For example, movement of a cursor on a display up/down may be indicated by the processed instructions when user input interface 910 indicates that an up/down button was selected. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

Control circuitry 904 may allow a user to provide user profile information or may automatically compile user profile information. For example, control circuitry 904 may access and monitor network data, video data, audio data, processing data, participation data from a conference participant profile. Control circuitry 904 may obtain all or part of other user profiles that are related to a particular user (e.g., via social media networks), and/or obtain information about the user from other sources that control circuitry 904 may access. As a result, a user can be provided with a unified experience across the user's different devices.

In some embodiments, the display mode application is a client/server-based application. Data for use by a thick or thin client implemented on each one of computing device 900 and computing device 901 may be retrieved on-demand by issuing requests to a server remote to each one of computing device 900 and computing device 901. For example, the remote server may store the instructions for the application in a storage device. The remote server may process the stored instructions using circuitry (e.g., control circuitry 904) and set the MEMS-display to the modes discussed above and below. The client device may receive the instructions to set the MEMS-display to a particular mode and may set the MEM-based display mode to the particular mode locally on computing device 900. This way, the processing of the instructions is performed remotely by the server while the resulting display mode is executed locally on computing device 900. Computing device 900 may receive inputs from the user via input interface 910 and transmit those inputs to the remote server for processing and retrieving the corresponding display mode command. For example, computing device 900 may transmit a communication to the remote server indicating that a directional viewing mode was selected via input interface 910. The remote server may process instructions in accordance with that input and retrieve the corresponding command to modify the pixel orientations of display 912 associated with the input. The display mode command may then be transmitted to computing device 900 for modification of the MEMS-based display.

In some embodiments, the display mode application may be downloaded and interpreted or otherwise run by an interpreter or virtual machine (run by control circuitry 904). In some embodiments, the video capture application may be encoded in the ETV Binary Interchange Format (EBIF), received by control circuitry 904 as part of a suitable feed, and interpreted by a user agent running on control circuitry 904. For example, the video capture application may be an EBIF application. In some embodiments, the video capture application may be defined by a series of JAVA-based files that are received and run by a local virtual machine or other suitable middleware executed by control circuitry 904. In some of such embodiments (e.g., those employing MPEG-2, MPEG-4, HEVC or any other suitable digital media encoding schemes), video capture application may be, for example, encoded and transmitted in an MPEG-2 object carousel with the MPEG audio and video packets of a program.

As shown in FIG. 10, devices 1006, 1007, 1008, and 1010 may be coupled to communication network 1009. In some embodiments, each of computing devices 1006, 1007, 1008, and 1010 may correspond to one of computing devices 900 or 901 of FIG. 9, vehicle dashboard 101 of FIG. 1, or the gaming surface of FIGS. 7A-7D. Computing device 1006 is a head-mounted computing device, e.g., corresponding to vehicle dashboard 101 of FIG. 1. Communication network 1009 may be one or more networks including the Internet, a mobile phone network, mobile, voice or data network (e.g., a 5G, 4G, or LTE network), cable network, public switched telephone network, or other types of communication network or combinations of communication networks. Paths (e.g., depicted as arrows connecting the respective devices to the communication network 1009) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 10 to avoid overcomplicating the drawing.

Although communications paths are not drawn between computing devices, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The computing devices may also communicate with each other directly through an indirect path via communication network 1009.

System 1000 may comprise media content source 1002, one or more servers 1004, and/or one or more edge computing devices. In some embodiments, the display mode application may be executed at one or more of control circuitry 1011 of server 1004 (and/or control circuitry of computing devices 1006, 1007, 1008, 1010 and/or control circuitry of one or more edge computing devices). In some embodiments, media content source 1002 and/or server 1004 may be configured to host or otherwise facilitate communication sessions between computing devices 1006, 1007, 1008, 1010 and/or any other suitable devices, and/or host or otherwise be in communication (e.g., over network 1009) with one or more social network services.

In some embodiments, server 1004 may include control circuitry 1011 and storage 1014 (e.g., RAM, ROM, Hard Disk, Removable Disk, etc.). Storage 1014 may store one or more databases. Server 1004 may also include an input/output path 1012. I/O path 1012 may provide video conferencing data, device information, or other data, over a local area network (LAN) or wide area network (WAN), and/or other content and data to control circuitry 1011, which may include processing circuitry, and storage 1014. Control circuitry 1011 may be used to send and receive commands, requests, and other suitable data using I/O path 1012, which may comprise I/O circuitry. I/O path 1012 may connect control circuitry 1011 (and specifically control circuitry) to one or more communications paths.

Control circuitry 1011 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 1011 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 1011 executes instructions for an emulation system application stored in memory (e.g., the storage 1014). Memory may be an electronic storage device provided as storage 1014 that is part of control circuitry 1011.

Figure 11:
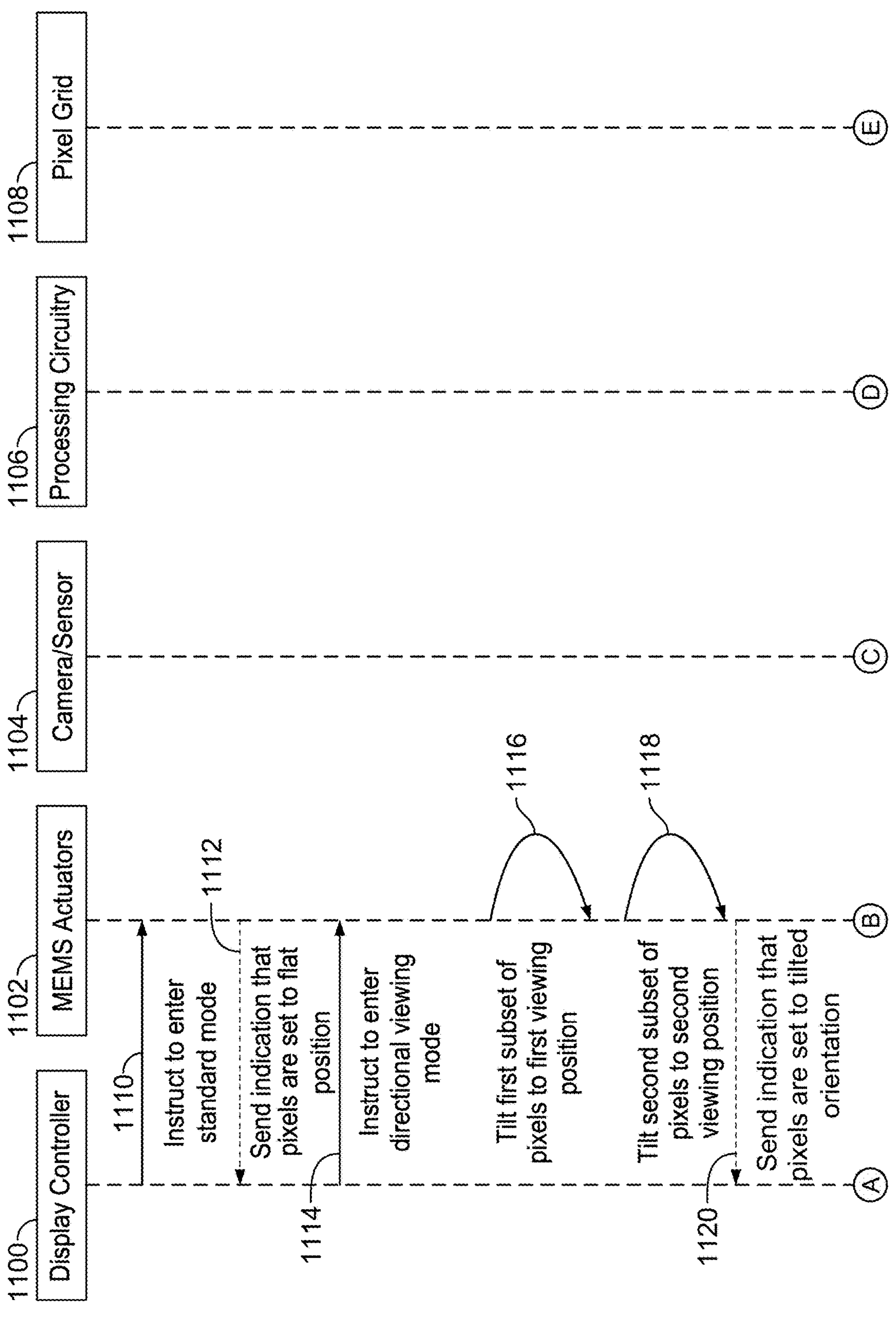
FIG. 11 is a sequence diagram showing an illustrative transfer of instructions between the display controller, MEMS actuators, camera/sensors, processing circuitry, and pixel grid, in accordance with embodiments of the disclosure.
Figure 11:
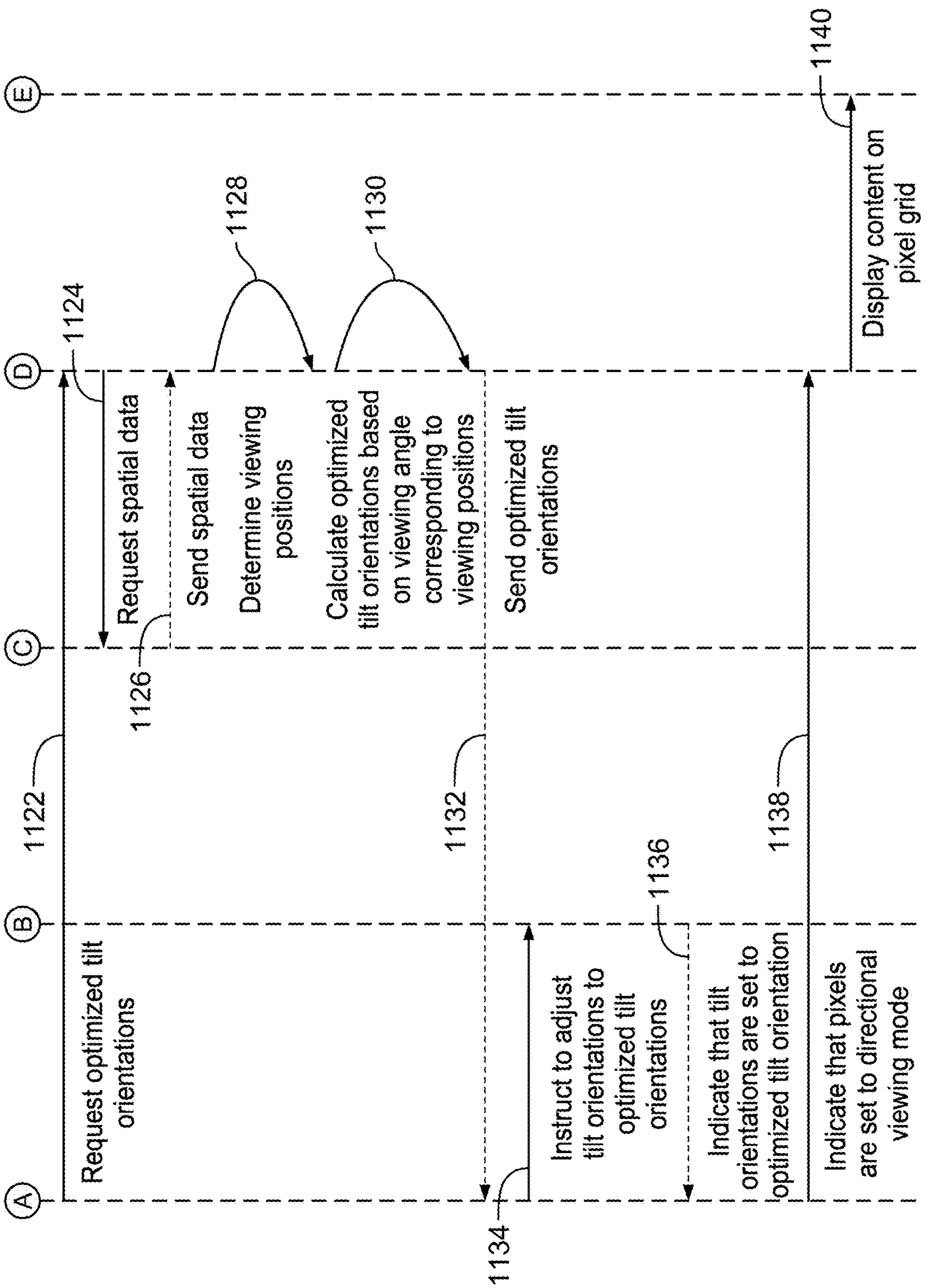

FIG. 11 is a sequence diagram showing an illustrative transfer of instructions between the display controller, MEMS actuators, cameras/sensors, processing circuitry, and pixel grid, in accordance with embodiments of the disclosure. FIG. 11 demonstrates how the various components of the MEMS-based display communicate with one another to enter the standard mode or directional mode of the display as well as adjusting the pixel orientations based on viewer position data. For example, at 1110, display controller 1100 (which may correspond to display controller 402 of FIG. 4) instructs MEMS actuators 1102 to tilt the pixels of the display to the standard mode. Display controller 1100 may receive an indication that the MEMS actuators 1102 have tilted the pixels of the display to a flat position at 1112. In some embodiments, the pixels of the display may be in the standard mode by default, e.g., when the display is turned off or on. At a later time, at 1114, the display controller transmits an instruction to MEMS actuators 1102 to enter the directional viewing mode. In some embodiments, display controller 1100 transmits the instruction to enter directional viewing mode, in response to receiving an input (e.g., via user input interface 910 of FIG. 9) corresponding to a request to enter directional viewing mode. In some embodiments, the display controller may transmit the instructions to the MEMS actuators to enter directional viewing mode automatically based on historical behavior and/or content preferences of the occupants. For example, in response to receiving a request to simultaneously display multiple content items, the display controller may automatically set the display to directional viewing mode based on determining (e.g., via control circuitry 904 of FIG. 9) that the viewers prefer directional viewing mode over other simultaneous viewing modes such as split screen. In response to receiving the instruction from display controller 1100, MEMS actuators 1102 tilt a first subset of pixels towards a first viewing position (e.g., viewing position A 110 in a vehicle interior of FIG. 1) at 1116, and a second subset of pixels towards a second viewing position (e.g., viewing position B 112 in a vehicle interior of FIG. 1) at 1118. Display controller receives an indication that each pixel subset has been tilted towards the viewing angle of its respective viewing position at 1120.

In some embodiments, the MEMS-based display may further adjust the pixel orientations to display content more precisely to the viewers. For example, at 1122, display controller 1100 requests optimized tilt orientations from processing circuitry 1106. The optimized tilt orientations may be pixel orientations that precisely match the viewing angles of the viewers of the display in the directional viewing mode, thus ensuring that each viewer sees content that is clear and unobstructed. In order to calculate the optimized tilt orientation, processing circuitry 1106 may request spatial data from camera/sensor 1104 (e.g., camera 918 of FIG. 9) at 1124. At 1126, processing circuitry 1106 may receive the spatial data from camera/sensor 1104. Using the spatial data, processing circuitry 1106 may then determine viewing positions of each viewer at 1128. The determined viewing position for a respective viewer may be the location of their eyes, their head, their body, a predetermined location, or any other suitable physical indicator. At 1130, processing circuitry 1106 may calculate the optimized tilt orientations by matching a tilt orientation to the viewing angles corresponding to the determined viewing positions. At 1132, processing circuitry 1106 may respond to display controller 1100's request for optimized tilt orientations by sending the calculated tilt orientations.

At 1134, display controller 1100 transmits instructions to MEMS actuators 1102 to adjust the tilt orientations of the respective pixel subsets to the calculated optimized tilt orientations. MEMS actuators 1102 may indicate to display controller 1100 that the pixel orientations have been set to the calculated optimized orientations at 1136. After the pixels are set to their optimized positions, the display can present two unique content items for two different viewing positions without either content item interfering with the other, as is described in the embodiment of the MEMS-based display of FIG. 1. At 1138, display controller 1100 indicates to processing circuitry 1106 that the pixels are set to directional viewing mode and therefore ready to present content. At 1140, processing circuitry 1106 renders content for the display and transmits it to pixel grid 1108 for presentation. In some embodiments, processing circuitry 1106 may render one content item for the first subset of pixels and a second content item for the second subset of pixels as is further described in relation o FIG. 1. In some embodiments, all pixels are oriented towards a single viewing position. In such embodiments, processing circuitry 1106 may render one content item to be displayed to the single viewing position.

Figure 12:
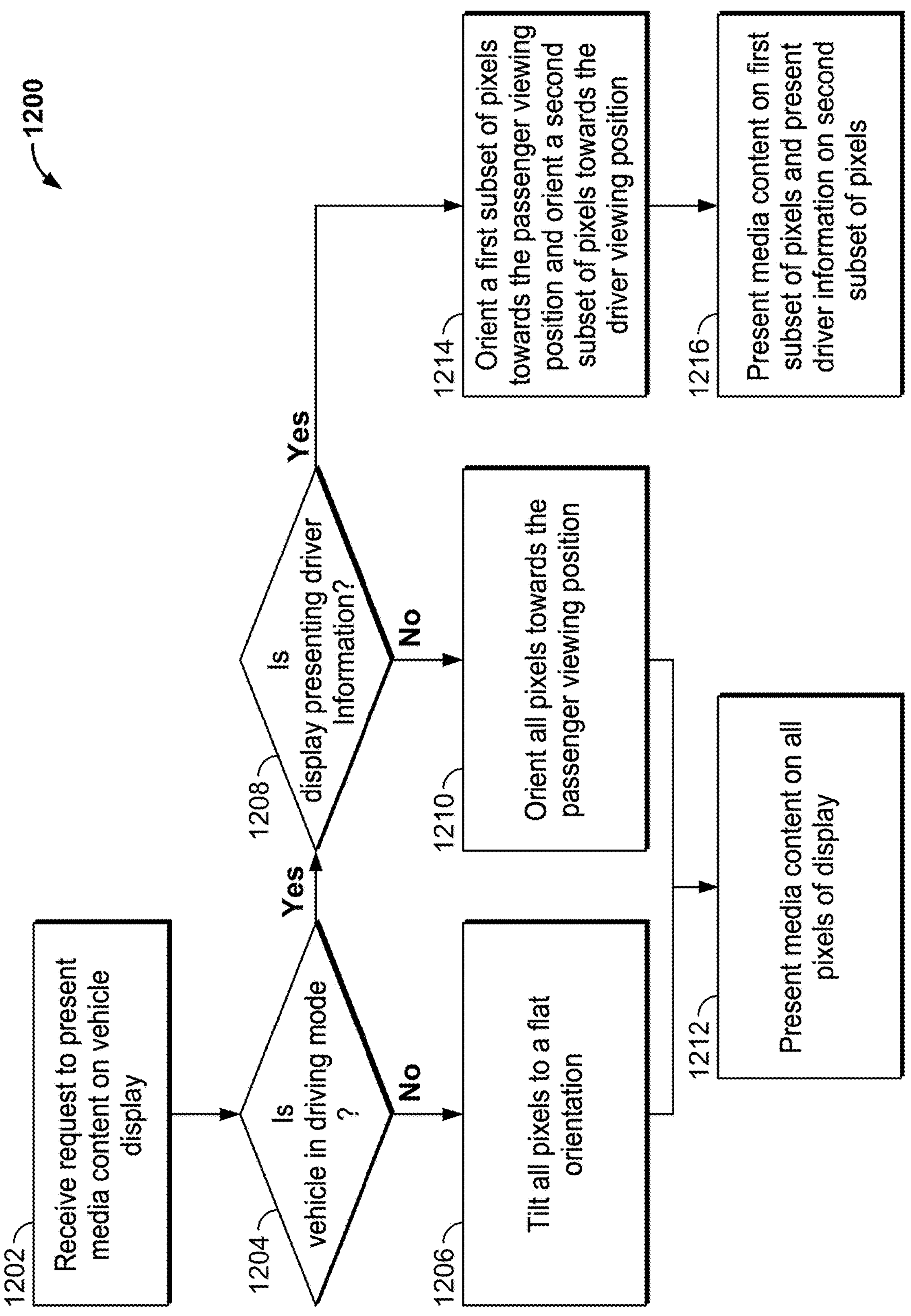
FIG. 12 is an illustrative flowchart for a process for modifying the MEMS-based display based on the content that is presented on the display, in accordance with some embodiments of this disclosure.

FIG. 12 is an illustrative flowchart for process 1200 of modifying the MEMS-based display based on the content that is presented on the display, in accordance with some embodiments of this disclosure. In various embodiments, the individual steps of process 1200 may be implemented by one or more components of the computing devices, processes, and systems of FIGS. 1-11 and 13 and may be performed in combination with any of the other processes and aspects described herein. Although the present disclosure may describe certain steps of process 1200 (and of other processes described herein) as being implemented by certain components of the computing devices, processes, and systems of FIGS. 1-11 and 13, this is for purposes of illustration only. It should be understood that other components of the computing devices, processes, and systems of FIGS. 1-11 and 13 may implement those steps instead.

At 1202, I/O circuitry (e.g., I/O circuitry 902 of computing device 900 of FIG. 9 and/or I/O circuitry 1012 of server 1004 of FIG. 10) may receive a request to present media content on a vehicle display (e.g., display 102 of FIG. 1 and/or display 202 of FIG. 2). In some embodiments, the vehicle display may be an integrated into a vehicle dashboard (e.g., vehicle dashboard 101 of FIG. 1 and/or vehicle dashboard 201 of FIG. 2) used for vehicle infotainment. The request may be received based on a user input for the media content. Such user input may be received in any suitable form, e.g., as voice input, tactile input, input received via a keyboard or remote, input received via a touchscreen, text-based input, biometric input, or any other suitable input, or any combination thereof.

At 1204, control circuitry (e.g., control circuitry 904 of computing device 900 of FIG. 9 and/or control circuitry 1011 of server 1004 of FIG. 10) may determine whether the vehicle is in driving mode or any other suitable mode that prohibits presentation of media content to a user in the vehicle (e.g., vehicle 100 of FIG. 1). For example, if a vehicle is in driving mode, a driver in the vehicle would be prohibited from viewing media content to prevent them from being distracted while operating the vehicle. In some embodiments, to determine whether the vehicle is in driving mode, the control circuitry may retrieve a current state of the vehicle (e.g., drive, park, reverse, neutral), whether the vehicle is being autonomously driven, current speed of the vehicle, or any other suitable data.

At 1206, if control circuitry determines that the vehicle is not in driving mode, control circuitry (e.g., display controller 402 of FIG. 4) may instruct the display (e.g., display 102 of FIG. 1 and/or display 202 of FIG. 2) to tilt all pixels to a flat position (i.e., standard mode as described in relation to FIGS. 1-2). Determining that the vehicle is not in driving mode indicates that media content can be displayed to all users without potentially distracting a driver of the vehicle and endangering other passenger(s) and other cars on the road. The control circuitry can therefore instruct the display to set all pixels to a flat position such that all potential viewers can see the media content from their viewing position. After all pixels are tilted to a flat position, the display may present the media content on all pixels of the display at 1212.

If the control circuitry determines, at 1204, that the vehicle is in driving mode, then, at 1208, control circuitry (e.g., control circuitry 904 of computing device 900 of FIG. 9 and/or control circuitry 1011 of server 1004 of FIG. 10) may determine whether the vehicle display is presenting other information such as driver information. For example, the driver of the vehicle may be using the display for navigation information (e.g., navigation information 114 of FIG. 1) while they are operating the vehicle. In some embodiments, even if the vehicle is in driving mode, the control circuitry may proceed to 1206, e.g., if the vehicle is stuck in traffic, the control circuitry may deem it appropriate to show the driver the same content as the passenger(s), or to show the driver their content while simultaneously providing different content to the passenger(s).

If the control circuitry determines, at 1208, that the display is not presenting driver information, then, at 1210, control circuitry (e.g., display controller 402 of FIG. 4) may instruct the display to orient all pixels towards the viewing position of the passenger(s) (i.e., set the pixels to no-distraction mode as described in relation to FIG. 2). For example, a front-seat passenger may want to use the display (e.g., display 102 of FIG. 1 and/or display 202 of FIG. 2) of the vehicle dashboard (e.g., vehicle dashboard 101 of FIG. 1 and/or vehicle dashboard 201 of FIG. 2) to watch a movie (or other content) while the driver is operating the vehicle. By tilting the pixels towards the viewing position of the passenger, the passenger is enabled to view the movie (or other content) without the potential of causing a distraction to the driver.

In some embodiments, the pixels tilt to an orientation associated with a viewing position stored in memory (e.g., storage 908 of FIG. 9 and/or storage 1014 of FIG. 10). For example, the location of the front-passenger seat may be stored in memory. In some embodiments, spatial data from cameras and/or sensors (e.g., camera 918 of FIG. 9) of the vehicle dashboard may be used to determine the viewing position of the user who requested the media content. For example, in response to receiving a request to view content, the control circuitry may identify the user who requested the content and determine where they are sitting in the vehicle. After the pixels are tilted to the viewing position of the passenger, the display may present the media content on all pixels of the display at 1212. Since the pixels are oriented to the viewing angle of the passenger's viewing position, only the passenger is enabled to see the content. The pixels do not emit any light in the direction of the driver when tilted towards the passenger and therefore do not cause any possible distractions to the driver.

If control circuitry determines, at 1208, that the display is presenting driver information, then, at 1214, control circuitry (e.g., display controller 402 of FIG. 4) may instruct the display to orient a first subset of pixels (e.g., pixel subset A 104) towards the viewing angle of the passenger viewing position and further instruct the display to orient a second subset of pixels (e.g., pixel subset B 106) towards the viewing angle of the driver viewing position (i.e., set the display to directional viewing mode as described in relation to FIG. 1). In this pixel configuration, any light emitted by the first subset of pixels is not directed to the driver's viewing position, and any light emitted by the second subset of pixels is not directed to the passenger's viewing position.

In some embodiments, the first and second subset of pixels tilt to their respective orientations based on a viewing position stored in memory (e.g., storage 908 of FIG. 9 and/or storage 1014 of FIG. 10). For example, the location of the front-passenger seat and driver seat may be stored in memory. In some embodiments, spatial data from cameras and/or sensors (e.g., camera 918 of FIG. 9) of the vehicle dashboard may be used to determine the viewing position of the user who requested the media content. For example, in response to receiving a request to view content, the control circuitry may identify the user who requested the content and determine where they are located in the vehicle. Subsequently or concurrently, the control circuitry may determine which user is performing an activity that should be done without distractions (e.g., driving), mark the respective distraction-prohibited viewer (e.g., the driver), and determines where the user is located in the vehicle.

At 1216, after the first and second subset of pixels are tilted to their respective orientations, the first subset of pixels presents the media content, and the second subset of pixels presents the driver information. Since light from each subset of pixels is visible only to the viewer of the respective viewing position that the subset of pixels is tilted towards, neither the driver nor passenger sees the content of the other user. For the driver, this ensures that they are not distracted by non-driving or non-vehicle information. For the passenger, this ensures that they can view their media content as a clear and unobstructed image. In some embodiments, the display may be equipped with a viewing angle limiter (e.g., viewing angle limiter 508 of FIG. 5) to further prevent any interference between the simultaneously displayed images on the display.

Figure 13:
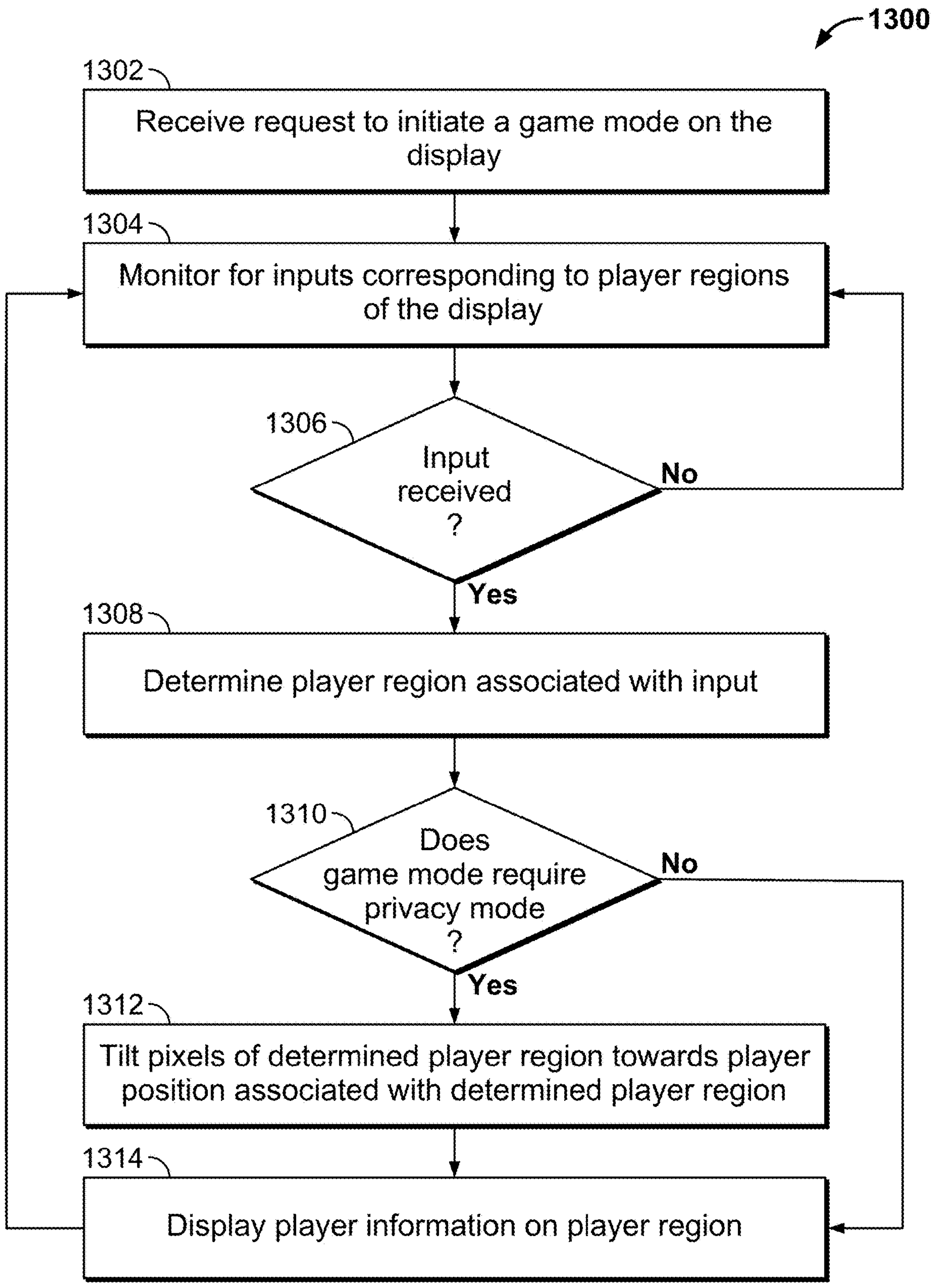
FIG. 13 is an illustrative flowchart for a process for modifying the MEMS-based display based on inputs received on the display surface, in accordance with some embodiments of this disclosure.

FIG. 13 is an illustrative flowchart for a process for modifying the MEMS-based display based on inputs received on the display surface, in accordance with some embodiments of this disclosure. In various embodiments, the individual steps of process 1300 may be implemented by one or more components of the computing devices, processes, and systems of FIGS. 1-12 and may be performed in combination with any of the other processes and aspects described herein. Although the present disclosure may describe certain steps of process 1300 (and of other processes described herein) as being implemented by certain components of the computing devices, processes, and systems of FIGS. 1-12, this is for purposes of illustration only. It should be understood that other components of the computing devices, processes, and systems of FIGS. 1-12 may implement those steps instead.

At 1302, I/O circuitry (e.g., I/O circuitry 902 of computing device 900 of FIG. 9 and/or I/O circuitry 1012 of server 1004 of FIG. 10) may receive a request to initiate a game on a display (e.g., the MEMS-based display of FIGS. 7A-7D). For example, I/O circuitry may receive a request to set the display to a gaming mode, wherein specific regions of the display are designated as private player regions (e.g., player regions 702, 706, 710, 712 of FIGS. 7A-7D). The player region may display content that is relevant only to the player that is associated with the respective player region. In some embodiments, the gaming mode may further include a play region that displays content relevant to all players involved in the gaming mode.

At 1304, control circuitry (e.g., control circuitry 904 of computing device 900 of FIG. 9 and/or control circuitry 1011 of server 1004 of FIG. 10) may monitor for any received inputs (e.g., received through user input interface 910 of FIG. 9) corresponding to player surfaces of the display. In some embodiments, an input is received from a user in order to cause the content to enter a particular region of the display into the gaming mode. For example, a user may press on a player region of the display that has not yet entered game mode (e.g., player regions 710, 712 of FIGS. 7A-7D) to enter the particular player region into the game mode. In some embodiments, the user input may be received in any suitable form, e.g., as voice input, tactile input, input received via a keyboard or remote, input received via a touchscreen, text-based input, biometric input, or any other suitable input, or any combination thereof.

At 1306, control circuitry (e.g., control circuitry 904 of computing device 900 of FIG. 9 and/or control circuitry 1011 of server 1004 of FIG. 10) determines whether any inputs have been received (e.g., received through user input interface 910 of FIG. 9). If control circuitry does not detect any received inputs, the process reverts to 1304 to monitor for inputs corresponding to player regions of the display. If, at 1306, control circuitry detects a received input, the process continues to 1308.

At 1308, control circuitry (e.g., control circuitry 904 of computing device 900 of FIG. 9 and/or control circuitry 1011 of server 1004 of FIG. 10) determines the player region associated with the received input. In some embodiments, control circuitry determines the player region associated with the received input based on the input interface. For example, the user may execute the input using a button, a user input region, a text entry, voice command, or any other suitable input interface that has an association with a particular player region stored in memory (e.g., storage 908 of FIG. 9).

In some embodiments, the received input may be ambiguous to a particular player region of the display. In such embodiments, control circuitry may employ tracking technology (e.g., as discussed in relation to FIGS. 1-3 and 6-7) to determine a viewing position of the user who executed the respective input. Control circuitry may then determine that the input corresponds to a particular player region based on the proximity between the particular player region and the determined viewing position.

At 1310, control circuitry (e.g., control circuitry 904 of computing device 900 of FIG. 9 and/or control circuitry 1011 of server 1004 of FIG. 10) determines whether the game requires a privacy mode for each respective player region. For example, a game of poker (e.g., as shown in FIGS. 7A-7D) may require a privacy mode for each player region to ensure that the cards of a player remain concealed to other players in the poker game. A game such as Monopoly would not require a privacy mode since there are no player components that require any type of secrecy towards other players. If control circuitry determines, at 1310, that no privacy mode is required for the determined player region of the display, the control circuitry may generate for display the player information at the determined player region at 1314 without a privacy mode.

If control circuitry determines, at 1310, that the game requires a privacy mode, then, at 1312, control circuitry (e.g., display controller 402 of FIG. 4) may tilt pixels of the determined player region towards the viewing angle of the player position associated with the determined player region. By tilting the pixels of the determined player region towards the viewing position of the player, the light emitted by the pixels is directed only to a player located at the respective viewing position. For example, as shown in FIG. 7A, content displayed by pixels of player region A 702 tilted towards the viewing angle of viewing position A 700 can be seen only by a user located at position A 700. Any users located outside of viewing position A 700 are not able to see content displayed in player region A 702, thus ensuring that any of the displayed player information in player region A 702 remains private.

In such embodiments, control circuitry may employ tracking technology (e.g., as discussed in relation to FIGS. 1-3 and 6-7) to precisely tilt the pixels of the player region to the user associated with the player region. For example, based on spatial data from a camera or sensor (e.g., camera 918 of FIG. 9), control circuitry may track the eyes of the user, the head of the user, the body of the user, any other suitable physical marker, or any combination thereof to direct the pixels towards the viewing angle of the user. This embodiment may further ensure that user information remains private in situations where multiple viewing positions are within close proximity of one another. In some embodiments, the player regions may include a viewing angle limiter to further prevent content of the player region to be visible from other viewing positions. After tilting the pixels of the determined player region, the control circuitry may generate for display the player information at the determined player region at 1314. While displaying the player information at the determined player region, process 1300 may revert to 1304, where it concurrently monitors for any additional inputs corresponding to inactive player regions of the display. This may enable users to join the game mode of the display even after the display has begun presenting player information in other player regions.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A system, comprising:
control circuitry;
a display, the display comprising:
a plurality of pixels corresponding to a plurality of subsets of the display; and
a plurality of micro-electromechanical system (MEMS) actuators,
wherein the control circuitry is configured to cause each respective MEMS actuator of the plurality of MEMS actuators to control an orientation of a respective pixel of the plurality of pixels by causing a first subset of the plurality of MEMS actuators to modify orientations of a corresponding first subset of the plurality of pixels associated with a first viewing position in an environment of the display; and
wherein the control circuitry is configured to cause the first subset of the plurality of pixels having the modified orientations to display particular content directed to the first viewing position, wherein the particular content is obscured from a second viewing position of the environment,
wherein the display further comprises, for each respective pixel of the plurality of pixels:
a MEMS rod configured to enable a height of the respective pixel to be adjusted, and
wherein the control circuitry is further configured to cause the first subset of the plurality of MEMS actuators to modify the orientations of the corresponding first subset of the plurality of pixels associated with the first viewing position in the environment of the display based at least in part on adjusting a height of at least one pixel of the first subset of the plurality of pixels using at least one MEMS rod.

2. The system of claim 1, wherein the particular content is a first content item, and wherein the control circuitry is further configured to:
cause a second subset of the plurality of MEMs actuators to modify orientations of a corresponding second subset of the plurality of pixels associated with the second viewing position in the environment of the display; and
cause the second subset of the plurality of pixels to display a second content item directed to the second viewing position, wherein the second content item is obscured from the first viewing position of the environment that is associated with the first subset of the plurality of pixels, wherein the first viewing position is different from the second viewing position, and the second content item is different from the first content item.

3. The system of claim 2, wherein the control circuitry is further configured to:
cause a third subset of the plurality of MEMs actuators to modify orientations of a corresponding third subset of the plurality of pixels associated with a third viewing position in the environment of the display;
cause the third subset of the plurality of pixels to display a third content item directed to the third viewing position, wherein the third content item is obscured from the first viewing position and the second viewing position of the environment;
cause a fourth subset of the plurality of MEMs actuators to modify orientations of a corresponding fourth subset of the plurality of pixels associated with a fourth viewing position in the environment of the display, and
cause the fourth subset of the plurality of pixels to display a fourth content item directed to the fourth viewing position, wherein the fourth content item is obscured from the first viewing position, the second viewing position, and the third viewing position of the environment.

4. The system of claim 3, wherein the control circuitry is further configured to:
cause a fifth subset of the plurality of pixels to display content without controlling MEMS actuators corresponding to the fifth subset of the plurality of pixels to modify orientations of the fifth subset of the plurality of pixels, wherein the particular content is directed to the first viewing position, the second viewing position, the third viewing position, and the fourth viewing position of the environment.

5. The system of claim 4, wherein the display is integrated on a tabletop of a gaming device.

6. The system of claim 2, wherein the control circuitry is further configured to:

cause the display to operate in a first mode and a second mode, wherein in the first mode:

the control circuitry causes the first subset of the plurality of MEMS actuators to modify the orientations of the corresponding first subset of the plurality of pixels associated with the first viewing position in the environment of the display, to cause the particular content to be directed to the first viewing position and to cause the particular content to be obscured from the second viewing position; and wherein in the second mode:

the control circuitry causes the plurality of pixels to display the particular content without causing the plurality of MEMS actuators to modify the orientations of the plurality of pixels, wherein the particular content is directed to both the first viewing position and the second viewing position of the environment.

7. The system of claim 2, wherein the first subset of the plurality of pixels and the second subset of the plurality of pixels are arranged in:

alternating rows between the first subset of the plurality of pixels and the second subset of the plurality of pixels;

alternating columns between the first subset of the plurality of pixels and the second subset of the plurality of pixels; or a checkered pattern between the first subset of the plurality of pixels and the second subset of the plurality of pixels.

8. The system of claim 1, wherein the particular content is a first content item, and wherein the control circuitry is further configured to:

cause the plurality of MEMS actuators to oscillate the plurality of pixels between a first orientation corresponding to the first viewing position and a second orientation corresponding to the second viewing position;

cause the plurality of pixels to display the first content item when the plurality of pixels orients to the first orientation; and cause the plurality of pixels to display a second content item when the plurality of pixels orients to the second orientation.

9. The system of claim 8, wherein the control circuitry is configured to set a rate at which the plurality of pixels oscillates based on a frame rate of the first content item and a frame rate of the second content item.

10. The system of claim 1, wherein each pixel of the plurality of pixels further comprises:

a retarder layer configured to narrow an area to which light emitted by the pixel is directed, wherein the particular content is caused to be obscured from the second viewing position based on the narrowed area caused by the retarder layer and the modified orientation of the first subset of the plurality of pixels.

11. The system of claim 1, further comprising a sensor, wherein the control circuitry is further configured to:

identify, based on sensor data received from the sensor, a location of a first user and a location of a second user; and determine, as the first viewing position, an area around the location of the first user; and determine, as the second viewing position, an area around the location of the second user.

12. The system of claim 1, wherein the display is a vehicle display, and the control circuitry is further configured to:

retrieve, from computer memory, an area around a location of a driver's seat as the first viewing position; and retrieve, from the computer memory, an area around a location of a passenger's seat as the second viewing position.

13. The system of claim 1, wherein each pixel of the plurality of pixels further comprises a plurality of sub-pixels and each MEMS actuator of the plurality of MEMS actuators further comprises sub-MEMS actuators, wherein the control circuitry is further configured to:

individually modify orientations of a corresponding subset of the plurality of sub-pixels of a respective pixel of the plurality of pixels.

14. A method for configuring a display, comprising:

causing each respective MEMS actuator of a plurality of MEMS actuators of the display to control an orientation of a respective pixel of a plurality of pixels of the display by causing a first subset of the plurality of MEMS actuators to modify orientations of a corresponding first subset of the plurality of pixels associated with a first viewing position in an environment of the display; and causing the first subset of the plurality of pixels having the modified orientations to display particular content directed to the first viewing position, which causes the particular content to be obscured from a second viewing position of the environment; and causing the first subset of the plurality of MEMS actuators to modify the orientations of the corresponding first subset of the plurality of pixels associated with the first viewing position in the environment of the display based at least in part on adjusting a height of at least one pixel of the first subset of the plurality of pixels using at least one MEMS rod of the at least one pixel.

15. The method of claim 14, wherein the particular content is a first content item, the method further comprising:

causing a second subset of the plurality of MEMs actuators to modify orientations of a corresponding second subset of the plurality of pixels associated with the second viewing position in the environment of the display; and causing the second subset of the plurality of pixels to display a second content item directed to the second viewing position, wherein the second content item is obscured from the first viewing position of the environment that is associated with the first subset of the plurality of pixels, wherein the first viewing position is different from the second viewing position, and the second content item is different from the first content item.

16. The method of claim 15, further comprising:

causing a third subset of the plurality of MEMs actuators to modify orientations of a corresponding third subset of the plurality of pixels associated with a third viewing position in the environment of the display;

causing the third subset of the plurality of pixels to display a third content item directed to the third viewing position, wherein the third content item is obscured from the first viewing position and the second viewing position of the environment;

causing a fourth subset of the plurality of MEMs actuators to modify orientations of a corresponding fourth subset of the plurality of pixels associated with a fourth viewing position in the environment of the display, and causing the fourth subset of the plurality of pixels to display a fourth content item directed to the fourth viewing position, wherein the fourth content item is obscured from the first viewing position, the second viewing position, and the third viewing position of the environment.

17. The method of claim 16, further comprising:

causing a fifth subset of the plurality of pixels to display content without controlling MEMS actuators corresponding to the fifth subset of the plurality of pixels to modify orientations of the fifth subset of the plurality of pixels, wherein the particular content is directed to the first viewing position, the second viewing position, the third viewing position, and the fourth viewing position of the environment.

18. The method of claim 17, wherein the display is integrated on a tabletop of a gaming device.

19. The method of claim 15, further comprising:

causing the display to operate in a first mode and a second mode, wherein the first mode comprises:

causing the subset of the plurality of MEMS actuators to modify the orientations of the corresponding first subset of the plurality of pixels associated with the first viewing position in the environment of the display, to cause the particular content to be directed to the first viewing position and to cause the particular content to be obscured from the second viewing position; and wherein the second mode comprises:

causing the plurality of pixels to display the particular content without causing the plurality of MEMS actuators to modify the orientations of the plurality of pixels, wherein the particular content is directed to both the first viewing position and the second viewing position of the environment.

* * * * *